US007271216B2

(12) United States Patent
Tanaka et al.

(10) Patent No.: US 7,271,216 B2
(45) Date of Patent: Sep. 18, 2007

(54) POLYURETHANE RESIN AQUEOUS DISPERSION AND SHEET MATERIAL OBTAINED FROM THE SAME

(75) Inventors: Tadashi Tanaka, Kyoto (JP); Yoshiyuki Iwasaki, Kyoto (JP); Yoshio Kobayashi, Kyoto (JP); Yoshiyuki Ueno, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 24 days.

(21) Appl. No.: 10/546,486

(22) PCT Filed: Feb. 25, 2003

(86) PCT No.: PCT/JP03/02013

§ 371 (c)(1),
(2), (4) Date: Aug. 22, 2005

(87) PCT Pub. No.: WO2004/076517

PCT Pub. Date: Sep. 10, 2004

(65) Prior Publication Data

US 2006/0111510 A1 May 25, 2006

(51) Int. Cl.
*C08J 3/00* (2006.01)
*C08K 3/20* (2006.01)
*C08L 75/00* (2006.01)
*B01F 3/08* (2006.01)
*B29B 9/06* (2006.01)

(52) U.S. Cl. ...................... 524/591; 523/223; 523/322; 523/323; 524/589; 524/590; 524/839; 524/840

(58) Field of Classification Search ................ 524/589, 524/590, 591, 839, 840; 523/223, 322, 323
See application file for complete search history.

(56) References Cited

U.S. PATENT DOCUMENTS

| | | | |
|---|---|---|---|
| 3,929,678 | A | 12/1975 | Laughlin et al. |
| 4,331,447 | A | 5/1982 | Kamada et al. |
| 4,524,104 | A | 6/1985 | Hagio et al. |
| 5,906,704 | A | 5/1999 | Matsuura et al. |
| 2003/0027923 | A1 | 2/2003 | Lo et al. |

FOREIGN PATENT DOCUMENTS

| | | |
|---|---|---|
| EP | 0407968 A2 * | 1/1991 |
| EP | 0 501 348 | 9/1992 |
| GB | 1 293 940 | 10/1972 |
| JP | 42-22719 | 11/1964 |
| JP | 45-1474 | 1/1970 |
| JP | 55-21044 | 6/1980 |
| JP | 61-76517 | 4/1986 |
| JP | 3-149214 | 6/1991 |
| JP | 9-52929 | 2/1997 |
| JP | 10-226719 | 8/1998 |
| JP | 11-323125 | 11/1999 |
| JP | 2000-109532 | 4/2000 |
| JP | 2000-345026 | 12/2000 |
| JP | 2002-212258 | 7/2002 |
| JP | 2003-138131 | 5/2003 |
| WO | WO97/10274 | 3/1997 |

* cited by examiner

*Primary Examiner*—Patrick Niland
(74) *Attorney, Agent, or Firm*—Hamre, Schumann, Mueller & Larson, P.C.

(57) ABSTRACT

The present invention provides an isocyanate group terminated prepolymer aqueous dispersion (A) that is composed of water and an isocyanate group terminated prepolymer (a) dispersed in the water, whose content in the (A) is in a range of 60 wt % to 85 wt %, wherein the (A) optionally contains a-surfactant in a range of 0 wt % to 10 wt % based on a weight of the (a), and a solvent in a range of 0 ppm to 5,000 ppm based on the weight of the (a). The present invention also provides a polyurethane resin aqueous dispersion (B) that is composed of a polyurethane resin (b), whose content in the (B) is in a range of 20 wt % to 65 wt %, wherein the (b) is obtained by a chain extension reaction of the (A). The present invention is capable of providing a polyurethane resin aqueous dispersion having excellent storage stability. The aqueous dispersion can be used in a polyurethane resin sheet material, a paint, an adhesive, a tackiness agent, or a fiber-treating agent that has less flammability, a high level of safety to the human body, and environmental friendliness, and is effectively applied in a leather-like polyurethane resin sheet material in which migration is prevented.

7 Claims, No Drawings

POLYURETHANE RESIN AQUEOUS DISPERSION AND SHEET MATERIAL OBTAINED FROM THE SAME

TECHNICAL FIELD

The present invention relates to an aqueous dispersion in which a prepolymer terminated with an isocyanate group is dispersed (hereinafter referred to as isocyanate group terminated prepolymer aqueous dispersion), and a polyurethane resin aqueous dispersion. The present invention particularly relates to a polyurethane resin aqueous dispersion for use in sheet materials, paints, adhesives, and agents for treating fibers.

BACKGROUND ART

Conventionally, in the production of polyurethane resin aqueous dispersions, organic solvents have been used for decreasing viscosities. However, recently, the use of organic solvents has raised problems from the viewpoints of the flammability of organic solvents, the safety to the human body, the impact on the environment, etc. To cope with the problems, a method for producing a polyurethane resin aqueous dispersion without using an organic solvent has been proposed (for instance, JP-A-3(1991)-149214).

However, the polyurethane resin aqueous dispersion produced by the foregoing method contains many polyurethane resin particles having relatively large particle diameters. The particles tend to settle, and therefore, the foregoing material has a problem in storage stability.

It is an object of the present invention to provide a polyurethane resin aqueous dispersion having excellent storage stability.

It is another object of the present invention to provide an isocyanate group terminated prepolymer aqueous dispersion for achieving the above-described object.

It is still another object of the present invention to provide an isocyanate group terminated prepolymer aqueous dispersion and a polyurethane resin aqueous dispersion, which does not contain, or contains a small amount of, a surfactant and a solvent.

It is still another object of the present invention to provide a polyurethane resin sheet material, a paint, an adhesive, a tackiness agent, or a fiber-treating agent having less flammability, a high level of safety to the human body, and environmental friendliness.

It is still another object of the present invention to provide a polyurethane resin sheet material, a paint, an adhesive, a tackiness agent, or a fiber-treating agent possessing excellent waterproofness.

It is still another object of the present invention to provide a leather-like polyurethane resin sheet material in which resin migration is prevented.

SUMMARY OF THE INVENTION

An isocyanate group terminated prepolymer aqueous dispersion (A) of the present invention comprises water and a prepolymer (a) terminated with an isocyanate group, the (a) being dispersed in the water, a content of the (a) in the (A) being in a range of 60 wt % to 85 wt %, wherein the (A) either does not contain a surfactant or contains a surfactant of not more than 10 wt % based on a weight of the (a), and either does not contain a solvent or contains a solvent of not more than 5,000 ppm based on the weight of the (a).

A method of the present invention for producing an isocyanate group terminated prepolymer aqueous dispersion (A) comprises the step of subjecting the (a) and water to contact mixing by employing a kneader having an operation power of not less than 20 $KW/m^3$ so as to disperse the (a) in the water, wherein the (a) either does not contain a surfactant or contains a surfactant of not more than 10 wt % based on a weight of the (a), and either does not contain a solvent or contains a solvent of not more than 5,000 ppm based on the weight of the (a).

A polyurethane resin aqueous dispersion (B) of the present invention comprises a polyurethane resin (b) obtained by causing the foregoing (A) to further undergo a chain extension reaction, the content of the (b) being 20 wt % to 65 wt %.

A method of the present invention for producing the (B) comprises the step of causing the chain extension reaction of the (A) by employing at least one dispersing machine selected from the group consisting of a stator/rotor dispersing machine, an ultrasonic dispersing machine, a high-pressure impact dispersing machine, and a vibration-mixing dispersing machine.

A polyurethane resin aqueous dispersion for use in a sheet material (B1) of the present invention comprises a polyurethane resin that is an anionic polyurethane resin (b1) having at least one group selected from the group consisting of a $—COO^-$ group and $—SO_3^-$ group, the group being in a range of 0.01 wt % to 8 wt % based on a weight of the polyurethane resin, wherein the polyurethane resin contains a nonionic surfactant having a HLB of 10 to 18, in a range of 0.1 wt % to 10 wt % based on the weight of the polyurethane resin, and an inorganic salt in a range of 0.1 wt % to 10 wt % based on the weight of the polyurethane resin, and the (B1) either does not contain a solvent, or contains a solvent of not more than 5,000 ppm based on the weight of the polyurethane resin.

A sheet material, a paint, an adhesive, a tackiness agent, or a fiber-treating agent of the present invention comprises the aforementioned material (B) or (B1).

DETAILED DESCRIPTION OF THE INVENTION

In an isocyanate group terminated prepolymer aqueous dispersion (A) of the first embodiment of the present invention, a content of the surfactant in the (A) is normally not more than 10% (hereinafter, unless otherwise provided, % refers to "percent by weight"), preferably not more than 5%, further preferably not more than 2%, based on the weight of the (a), and particularly preferably the (A) does not contain a surfactant. As the (A) contains a smaller amount of a surfactant, a polyurethane resin-applied product such as a paint in which the (A) is used possesses increased waterproofness.

The content of a surfactant can be measured by the following method.

The (A) is applied over a polypropylene plate with a size of 30×30 cm so that a dried coating mm of the same has an average thickness of 200±30 μm, and is dried at room temperature for 24 hours, and further, at 80° C. for 3 hours. A film obtained by peeling the coating film off is used as a sample. 5 g of the foregoing sample and 150 g of methanol are put in a Soxhlet extractor, and are subjected to an extracting operation at 60° C. for 6 hours. Thereafter, extracted liquid is dried and the extract thus obtained is weighed, and the content of the surfactant is calculated by the formula shown below.

Content of surfactant (%)=[(weight of extract)÷(weight of sample)]×100

A content of a solvent in the (A) is normally not more than 5,000 ppm, preferably not more than 3,000 ppm, further preferably not more than 1,000 ppm, based on the weight of the (a), and particularly preferably the (A) does not contain a solvent. It is preferable that the content of the solvent is smaller, since this allows the (A), a material (B) that will be described later, and a sheet material in which the (B) is used to have less flammability in the manufacturing process, excellent safety to the human body, and decreased impact on the environment.

A content of a solvent can be measured by a method according to gas chromatography.

The (A) contains the (a) of 60% to 85%, preferably 65% to 80%.

Since the (a) accounting for 60% or more increases a shearing efficiency at the time of producing the (A), the (a) more easily becomes fine particles, and particularly a ratio of particles having a particle diameter of 5,000 nanometers (hereinafter referred to as nm) or more decreases. Consequently, the particles of the (a) dispersed therein or particles of a resin (b) that will be described later seldom settle in the (A) and the (B) that will be described later, respectively, whereby the (A) and (B) have excellent storage stability. Further, since the (a) accounts for 60% or more, a relatively high-concentration aqueous dispersion can be obtained as the (B) in which the (A) is used, and this is preferable since a paint, etc., made of the (B) attains a property of drying quickly.

Further, since the (a) accounts for 85% or less in the (A), a phase transition at the time of producing the (A) easily occurs, whereby emulsification thereof easily occurs.

The content of the (a) in an aqueous dispersion of the present invention is derived in the following manner: approximately 1.80 g of a sample of the (A) or (B) is weighed and placed on a glass petri dish with a diameter of 9 cm, dried by an air circulating dryer at 130° C. for 90 minutes, and a weight of the sample thus dried is expressed by percentage with respect to the original weight of the sample.

Particles of the (a) in the (A) preferably have an average particle diameter of 30 nm to 500 nm, more preferably 30 nm to 300 nm.

A content of particles of the (a) having a particle diameter of not less than 5,000 nm in the (A) preferably is not more than 1 percent by volume (hereinafter referred to as vol %), more preferably not more than 0.2 vol %, particularly preferably 0 vol %.

Since particles with a particle diameter of not less than 5,000 nm are not more than 1 vol %, particles that settle are few, whereby the foregoing (A) and the (B) made of the (A), which will be described later, are imparted with particularly excellent storage stability.

The particle diameter distribution in the present invention is measured by the following manner: 100 ml of water is put in a beaker with a capacity of 200 ml, 0.1 g of the (A) or (B) is added thereto while being stirred by a magnetic stirrer (1,000 rpm), and after being stirred for 10 minutes, the particle diameter distribution thereof is measured by a laser diffraction/scattering particle size distribution analyzer ("LA-700" model, manufactured by Horiba, Ltd.).

Isocyanate-terminated Prepolymer (a)

The (a) in the present invention includes an organic polyisocyanate (a1) and an active hydrogen atom-containing component (hereinafter referred to simply as active H component).

The active H component is composed of at least one chemical compound selected from the group consisting of high-molecular-weight polyols (a2), low-molecular-weight polyols (a3) as required, chemical compounds (a4) containing a hydrophilic group and an active hydrogen atom-containing group (hereinafter referred to simply as active H group) in a molecule, and other active H group-containing chemical compounds (a5).

As the (a1), organic polyisocyanates that conventionally have been used in the production of polyurethanes can be used. Examples of such polyisocyanates include aromatic polyisocyanates each of which has 2 to 3, or more isocyanate groups and has 6 to 20 carbon atoms (except for carbon atoms in NCO groups, this applies hereinafter) (the term "carbon atom(s)" is hereinafter abbreviated as C sometimes), aliphatic polyisocyanates (C: 2 to 18), alicyclic polyisocyanates (C: 4 to 15), araliphatic polyisocyanates (C: 8 to 15), modified polyisocyanates obtained by modifying the same, and combinations of two or more of the same.

Examples of the aromatic polyisocyanates include 1,3-and/or 1,4-phenylene diisocyanate, 2,4-and/or 2,6-tolylene diisocyanate (TDI), crude TDI, 4,4'-and/or 2,4'-diphenylmethane diisocyanate (MDI), crude MDI [phosgenites of crude diaminodiphenyl methane {condensation product of formaldehyde and aromatic amine (e.g., aniline) or a mixture of the same; or a mixture of diaminodiphenyl methane and a small amount (e.g., 5 to 20 wt %) of a polyamine having three or more functional groups}, polyallyl polyisocyanate (PAPI)], 4,4'-diisocyanate biphenyl, 3,3'-dimethyl-4,4'-diisocyanate biphenyl, 3,3'-dimethyl-4,4'-diisocyanatodiphenylmethane, 1,5-naphthylene diisocyanate, 4,4', 4"-triphenylmethan triisocyanate, m- or p-isocyanatophenylsulfonyl isocyanate. Examples of the aliphatic polyisocyanates include ethylene diisocyanate, tetramethylene diisocyanate, hexamethylene diisocyanate (HDI), dodecamethylene diisocyanate, 1,6,11-undecan triisocyanate, 2,2,4-trimethyl hexamethylene diisocyanate, lysine diisocyanate, 2,6-diisocyanate methyl caproate, bis(2-isocyanatoethyl) fumarate, bis(2-isocyanatoethyl)carbonate, 2-isocyanatoethyl-2,6-diisocyanatohexanoate, and the like. Examples of the alicyclic polyisocyanates include isophorone diisocyanate (IPDI), dicyclohexilemethane-4,4'-diisocyanate (hydrogenated-MDI), cyclohexylene diisocyanate, methyl cyclohexylene diisocyanate (hydrogenated-TDI), bis(2-isocyanatoethyl)-4-cyclohexen-1,2-dicarboxylate, 2,5- and/or 2,6-norbornane diisocyanate, and the like. Examples of the araliphatic polyisocyanates include m- and/or p-xylylene diisocyanate (XDI), α,α,α',α'-tetramethyl xylylene diisocyanate (TMXDI), and the like. Examples of the modified polyisocyanates include modified products of the aforementioned polyisocyanates (modified products containing an urethane group, a carbodiimide group, an arophanate group, a urea group, a biuret group, a uretdione group, a uretoneimine group, an isocyanurate group, and/or an oxazolidone group, etc.; those in which a content of a free isocyanate group is normally 8% to 33%, preferably 10% to 30%, particularly 12% to 29%), for instance, modified MDI (urethane-modified MDI, carbodiimide-modified MDI, trihydrocarbyl phosphate-modified MDI, etc.), urethane-modified TDI, biuret-modified HDI, isocyanurate-modified HDI, isocyanurate-modified IPDI, etc. Examples of a polyol used in the production of a urethane-modified polyisocyanate [a free-isocyanate-containing prepolymer, obtained by causing a reaction between excess polyisocyanate (TDI, MDI, etc.) and a polyol] include low-molecular-weight polyols that will be described later. Examples of the combinations of two or more include combinations of modified MDI and urethane-modified TDI (isocyanate-containing prepolymer). Among these, those having two to three functional groups, TDI, MDI, HDI, IPDI, hydrogenated MDI, XDI, and TMXDI are preferred. Among these, TDI, HDI, and IPDI are particularly preferred.

Examples of the (a2) include polyester polyols (p1), polyether polyols (p2), polyolefin polyols (p3), and polymer polyols (p4), each of which has a hydroxyl equivalent (Mn per a hydroxyl group) of not less than 400. It should be noted that hereinbefore and hereinafter "Mn" refers to a number-average molecular weight measured by gel permeation chromatography (GPC).

Examples of the (p1) include condensed-type polyesters (p11), polylactone polyols (p12), polycarbonate polyols (p13), and castor oil-based polyols (p14).

Examples of the (p2) include alkylene oxide (hereinafter abbreviated as AO) adducts of active H group-containing compounds (p21), and coupled products of the same (p22).

Examples of the (a3) include polyhydric alcohols (a31) and low-mole AO adducts (a32) of active H compounds, each of which has a hydroxyl equivalent of not less than 30 and more than 400, and has 2 to 8 or more hydroxyl groups.

Examples of the (a31) include dihydric alcohols, for instance, aliphatic, alicyclic, and aromatic dihydric alcohols having 2 to 12 or more carbon atoms [(di)alkylene glycols (the term "(di)alkylene glycols" refers to alkylene glycols and dialkylene glycols; hereinafter an expression like this is used in the same way), for instance, (di)ethylene glycol, (di)propylene glycol, 1,2-, 1,3-, 2,3-, and 1,4-butane diols, neopentylglycol, 3-methyl-1,5 pentanediol, 1,6-hexanediol, 2-methyl-1,8-octanediol, 1,9-nonanediol, and 1,12-dodecanediol; low-molecular-weight diols having a cyclic group, for instance, 1,4-bis(hydroxymethyl)cyclohexane, 1,4-cyclohexanediol, etc., disclosed in, for instance, JP-B-45 (1970)-1474]; polyhydric alcohols having 3 to 8 or more hydroxyl groups, for instance, alkane polyols (triols, for instance, trimethylol propane, glycerin, and hexane triol; high-functional polyols having 4 or more hydroxyl groups, for instance, pentaerythritol, sorbitol, xylitol, and mannitol), intramolecular or intermolecular dehydration products of the same (diglycerol, dipentaerythritol, sorbitan, etc.), saccharides (glucose, fructose, sucrose, etc.), and derivatives of the same (glucoside, for instance, α-methylglucoside); and polyols containing hydrophilic groups that will be described later. Among the (a3), the (a31) are preferred, aliphatic dihydric alcohols are more preferred, and 1,4-butane diol (hereinafter abbreviated as BG) is particularly preferred.

Examples of the AOs used for producing the (p21) and the (a32) include AOs having 2 to 12 or more carbon atoms, for instance, ethylene oxide (hereinafter abbreviated as EO), propylene oxide (hereinafter abbreviated as PO), 1,2-, 2,3-, or 1,3-butylene oxides, tetrahydrofuran, α-olefin oxides, styrene oxides, epihalohydrins (epichlorohydrin, etc.), and combinations of two or more of the same (random and/or block).

Examples of the active H compounds used for producing the (p2) and the (a32) include chemical compounds having 2 to 8 or more active hydrogen atoms (chemical compounds having one or two types of groups such as a hydroxyl group, an amino group, a mercapto group, etc.); for instance, polyhydric alcohols, polyhydric phenols, amines, polythiols, and mixtures of two of these. Examples of the polyhydric alcohols include those described above. Examples of the polyphenols include monocyclic polyhydric phenols (pyrogallol, catechol, hydroquinone, etc.), and bisphenols (bisphenol A, bisphenol F, bisphenol S, etc.).

Examples of the amines include monoamines and polyamines. Examples of the monoamines include ammonia; primary monoamines, such as monohydrocarbyl having 1 to 20 carbon atoms (alkyl, cycloalkyl, aryl, aralkyl), amines (butylamine, cyclohexylamine, aniline, benzylamine, etc.); and alkanol amines (those having a hydroxyalkyl group with 2 to 4 carbon atoms: monoethanolamine, diethanolamine, trieihanolamine, triisopropanolamine, etc.).

Examples of the polyamines include aliphatic polyamines having 2 to 8 carbon atoms [for instance, alkylene diamines (ethylene diamine, trimethylene diamine, hexamethylene diamine, etc.), and polyalkylene polyamines (diethylene triamine, etc.)], alicyclic polyamines having 4 to 15 carbon atoms (dicyclohexylmethane diamine, isophorone diamine, etc.), araliphatic polyamines having 8 to 15 carbon atoms (xylylene diamine, etc.), aromatic polyamines having 6 to 20 carbon atoms (phenylene diamine, tolylene diamine, diethyltolylene diamine, diphenylmethane diamine, diphenylether diamine, polyphenylmethane polyamine, etc.), and heterocyclic polyamines (piperazine, N-aminoethylpiperazine, and others disclosed in JP-B-55(1980)-21044 such as imidazoline, pyrrolidine, piperidine, and 2-aminopyridine).

Examples of polythiols include polythiols equivalent to the above-described polyhydric alcohols (in which at least a part of OH groups thereof are substituted with SH groups), polythiols obtained by a reaction between a compound having a glycidyl group and hydrogen sulfide, etc.

The addition of AO to an active H compound can be carried out by a usual method, without a catalyst or in the presence of a catalyst (for instance, an alkaline catalyst, an amine-based catalyst, an acidic catalyst) (particularly at a latter stage in the addition of AO) under a normal pressure or an increased pressure in one or a plurality of stages. For example, an active H compound and a catalyst are placed in a pressure reactor, and AO is introduced therein while being pressurized. Examples of the catalyst include: alkaline catalysts such as hydroxides of alkaline metals (lithium, sodium, potassium, and cesium); acids [perhalogenic acids (perchloric acid, perbromic acid, periodic acid), sulfuc acid, phosphoric acid, nitric acid, and the like, among which perchloric acid is preferred], and salts of the same [preferably, salts of bivalent or trivalent metals (Mg, Ca, Sr, Ba, Zn, Co, Ni, Cu, Al)]. A reaction temperature is normally 50° C. to 150° C., and a reaction time is normally 2 to 20 hours.

In the case where two or more AOs are used in combination, the addition of the same may be block addition (the capped type, the balanced type, the active secondary type, etc.), random addition, or a combination of the foregoing two [capped after random addition: having ethylene oxide chains of 0 wt % to 50 wt % (preferably 5 wt % to 40 wt %) arbitrarily distributed in a molecule, and being capped with an EO chain of 0 wt % to 30 wt % (preferably 5 wt % to 25 wt %) at a terminal of the molecular chain]. Among the AOs, EO alone, PO alone, THF (tetrahydrofuran) alone, PO and EO in combination, PO and/or EO and THF in combination are preferred (in the combination cases, the addition of the same preferably is random addition, block addition, and mixture of the same).

The number of added moles of AO is normally 1 to 140, preferably 1 to 110, and particularly preferably 1 to 90 per one active hydrogen atom. The number of added moles of not more than 140 is preferable since in this case a polyurethane resin obtained does not have an inconvenience such as being excessively soft or having a decreased strength.

After the completion of the AO addition reaction, the catalyst may be neutralized as required and be treated with an absorbent so that the catalyst is removed for purification.

Examples of the (p21) include, for instance, polyoxyethylene polyol [polyethylene glycol (hereinafter abbreviated as PEG), etc.], polyoxypropylene polyol [polypropylene glycol (hereinafter abbreviated as PPG), etc.], polyoxyethylene/propylene polyol, polytetramethylene ether glycol, and EO and/or PO adducts of bisphenols.

Examples of the (p22) include those obtained by coupling two or more molecules of the (p21) by using alkylene halide (C: 1 to 6, for instance, methylene dichloride).

The (p2) desirably has a smaller unsaturation degree (not more than 0.1 meq/g, preferably not more than 0.05 meq/g, particularly preferably not more than 0.02 meq/g), and desirably contains primary hydroxyl groups that account for at least 30%, preferably at least 50%, particularly preferably at least 70% of all the hydroxyl groups therein.

Examples of the (p 11) include polycondensation products obtained by condensation polymerization of a polyol and a polycarboxylic acid (c1), examples of the (p12) include polyaddition products obtained by polyaddition of lactone (c2) to a polyol, examples of the (p13) include polyaddition products obtained by polyaddition of a alkylene carbonate (c3) to a polyol, and examples of the (p14) include castor oil, and castor oil modified with a polyol or AO.

Examples of the polyols used for forming those above-described include (a3) and/or (p2) [preferably those having a hydroxyl equivalent of not more than 500].

Examples of the (c1) include aliphatic, alicyclic, or aromatic carboxylic acids having a valence of 2 to 8 or more and 4 to 40 or more carbon atoms, which include dicarboxylic acids such as aliphatic dicarboxylic acids (succinic acid, adipic acid, azelaic acid, sebacic acid, fumaric acid, maleic acid, etc.), alicyclic dicarboxylic acids (dimeric acid, etc.), aromatic dicarboxylic acids (terephthalic acid, isophthalic acid, phthalic acid, etc.), and polycarboxylic acids having a valence of 3 or more (trimellitic acid, pyromellitic acid, etc.). Among these, it is preferable to use the dicarboxylic acid, and a combination of the dicarboxylic acid and a small amount (not more than 20%) of the polycarboxylic acid having a valence of 3 or more.

Examples of the (c2) include lactones having 4 to 12 carbon atoms such as 4-butanolide, 5-pentanolide, and 6-hexanolide. Examples of the (c3) include alkylene (C: 2 to 8) carbonate such as ethylene carbonate and propylene carbonate. These may be used in combination of two or more.

The (p1) can be produced by a normal method. The (p11) can be produced by, for instance, a dehydration condensation polymerization or transesterification of the (c1) or an ester-forming derivative of the same [an anhydride of an acid (maleic anhydride, phthalic anhydride, etc.), lower alkyl (C: 1 to 4) esters (dimethyl adipate, dimethyl terephthalate, etc.), an acid halide (acid chloride, etc.)] with a polyol in an excess equivalent amount, or by dehydrating condensation polymerization or transesterification of the (c1) or an ester-forming derivative of the same with a polyol followed by a reaction with AO, or alternatively, by a reaction of a polyol with an acid anhydride and AO. The (p12) and the (p13) can be produced by polyaddition of the (c2) or (c3) using a polyol as an initiator. The modified castor oil can be produced by transesterification of the castor oil with a polyol and/or AO addition of the same.

Examples of the (p11) include polyethylene adipate diol, polybutylene adipate diol [for instance, "SANESTER 4620" (Mn=2,000) produced by Sanyo Chemical Industries Co., Ltd., hereinafter abbreviated as PES], polyhexamethylene adipate diol, polyneopentyl adipate diol, polyethylene propylene adipate diol, polyethylene butylene adipate diol, polybutylene hexamethylene adipate diol, polydiethylene adipate diol, poly(polytetramethylene ether) adipate diol, poly(3-methylpentylene adipate) diol, polyethylene azelate diol, polyethylene sebacate diol, polybutylene azelate diol, polybutylene sebacate diol, and polyneopentyl terephthalate diol. Examples of the (p12) include polycaprolactone diol, polyvalerolactone diol, and polycaprolactone triol. Examples of the (p13) include polyhexamethylene carbonate diol [for instance, "Nipporan 980R" (Mn=2,000) produced by Nippon Polyurethane Industry Co., Ltd., hereinafter abbreviated as PC]. Examples of the (p 14) include castor oil, trimethylol propane-modified castor oil, pentaerythritol-modified castor oil, EO (4 to 30 moles) adducts of castor oil.

Examples of the (p3) include: polyalkadiene-based polyols, such as polybutadiene diol [diol of polybutadiene having a 1,2-vinyl structure and/or a 1,4-trans structure (butadiene homopolymer, and copolymer such as styrene butadiene copolymer, acrylonitrile butadiene copolymer)], and hydrogenation products of the same (hydrogenation ratio: for instance, 20% to 100%); and acryl-base polyols, such as copolymers of hydroxyalkyl (C: 2 to 6) (meth) acrylate [ethyl hydroxyethyl (meth)acrylate, etc.] and other monomers [styrene, alkyl (C: 1 to 18) (meth)acrylate, etc.]. Here, it should be noted that "(meth)acryl . . . " refers to "acryl . . . " or "methacryl . . . ". Examples of the polybutadiene diol include "NISSO-PBG" series (e.g., "G-1000", "G-2000", "G-3000", etc.) produced by Nippon Soda Co., Ltd., and "Poly Bd" (e.g., "R-45M", "R-45HT", "CS-15", "CN-15", etc.) produced by ARCO chemical Co. in the US.

Examples of the (p4) include polymer-containing polyols that are obtained by polymerizing a radical-polymerizable monomers in situ in a polyol [the above-described (p1) and/or the (p2), and the (a3) as required]. Examples of the monomer include styrene, (meth)acrylonitrile, (meth)acrylate, vinyl chloride, and mixtures of two or more of the same. The polymerization of a monomer is performed normally in the presence of a polymerization initiator. Examples of the polymerization initiator include those that initiate polymerization by generating free radicals, for instance, azo compounds such as 2,2'-azobisisobutyronitrile (AIBN) and 2,2'-azobis-(2,4-dimethylvaleronitrile) (AVN); dibenzoyl peroxide, dicumyl peroxide, peroxides other than those described above, disclosed in JP-A-61(1986)-76517 (for instance, lauroyl peroxide, di-t-butyl peroxide, butyl isobutyl peroxide), salts of persulfurc acid, salts of perboric acid, and persuccinic acid. The azo compounds, particularly AIBN and AVN, are preferred. The amount of the polymerization initiator to be used is normally 0.1% to 20%, preferably 0.2% to 10% based on the total amount of monomer. The polymerization in a polyol can be performed without a solvent, but in the case where the concentration of the polymer is high, the polymerization is performed preferably in the presence of an organic solvent. Examples of the organic solvent include benzene, toluene, xylene, acetonitrile, ethyl acetate, hexane, heptane, dioxane, N,N-dimethylformamide, N,N-dimethyl acetamide, isopropyl alcohol, and n-butanol. The polymerization may be performed in the presence of a chain transfer agent (alkylmercaptans, carbon tetrachloride, carbon tetrabromide, chloroform, enol ethers, etc.) as needed. The polymerization may be performed at a temperature at or higher than a decomposition temperature of the polymerization initiator, normally 60° C. to 180° C., preferably 90° C. to 160° C., and under an atmospheric pressure, an increased pressure, or a reduced pressure. After the completion of the polymerization reaction, the polymer polyol obtained can be used in the as-is state for forming a polyurethane, but it is desirable that after the completion of the reaction, impurities such as an organic solvent, decomposition products of a polymerization initiator, and non-reacted monomers are removed by a conventional means.

The (p4) is a semi-transparent or opaque, white or yellowish dispersion, which is a polyol in which a polymerized monomer, that is, a polymer, of normally 30% to 70% (preferably 40% to 60%, particularly preferably 50% to 55%) is dispersed. The hydroxyl value of the (p4) is normally 10 to 300, preferably 20 to 250, particularly preferably 30 to 200.

Among the (a2), the (p1) and the (p2) are preferred, among which the (p1) is further preferred. Among these, the (p11) and the (p13) are particularly preferred.

The (a2) normally has a hydroxyl equivalent of 400 to 3,000, preferably 400 to 2,000, particularly preferably 500 to 1,700. In the case where the hydroxyl equivalent thereof is 400 to 5,000, a polyurethane resin produced using the same will have excellent flexibility.

The (a2) normally has an average number of functional groups of 2 to 3, preferably 2.3 to 3, and more preferably 2.4 to 2.9. In the case where the average number of functional groups thereof is 2 to 3, a polyurethane resin produced using the same will have excellent flexibility, and excellent solvent resistance.

The (a2) normally has a Mn of 800 to 9,000, and preferably 1,000 to 4,000.

The (a2) may be used without the (a3), or may be used along with the (a3) in combination, but in the case where the (a3) is used in combination, it is preferable to use the (a3) in a small amount (for instance, not more than 20%), considering the properties of a polyurethane resin.

As the active H component to be used in the reaction with the (a1), the compound (a4) containing a hydrophilic group and an active H group in its molecule may be used additionally. By so doing, an aqueous dispersion of an autoemulsifying-type (a) can be obtained. The autoemulsilying-type (a) is preferable as compared with the (a) without the use of the (a4), which is emulsified by an emulsifier, since the autoemulsifying-type (a) does not require an emulsifier or requires only a small amount of the same to be used, whereby in the case where the material obtained is used for forming a paint or a sheet material to be described later, the paint or the sheet material is allowed to have excellent waterproofness.

Examples of the hydrophilic group in the (a4) include anionic groups (sulfonic acid group, sulfamic acid group, phosphoric acid group, carboxyl group, etc., and salts of the same), cationic groups (quaternary ammonium groups, primary to tertiary amino groups, and salts of the same), and nonionic groups (an oxyethylene group, a hydroxyl group, etc.).

Examples of the (a4) include compounds containing 1, or 2 to 8, or more active H groups, and examples of the active H group include a hydroxyl group and an amino group. Compounds having two or more (particular two) active H groups, and combinations of the same with compounds having one active H group are preferred (the ratio by weight of the two in combination is 100/0 to 50/50).

Examples of the compounds having an anionic group and an active H group (a41) include:

(a411) compounds having a sulfonic acid group and an active H group:

diol sulfates [3-(2,3-dihydroxypropoxy)-1-propane sulfonic acid (hereinafter abbreviated as DHS), di(ethylene glycol) sulfoisophthalate, etc.], and aminosulfonic acids [2-aminoethane sulfonic acid, 3-aminopropane sulfonic acid, etc.], (a412) compounds having a sulfamic acid group and an active H group:

diol sulfamates [N,N-bis(2-hydroxyalkyl) sulfamate (C in an alkyl group: 1 to 6) or AO adducts of the same (EO or PO, etc., is used as AO, the number of added moles of AO:1 to 6): for instance, N,N-bis(2-hydroxyethyl) sulfamic acid, PO (2 moles) adduct of N,N-bis(2-hydroxyethyl) sulfamic acid, etc.], (a413) compounds having a carboxyl group and an active H group:

dialkylol alkanoic acids [C: 6 to 24, for instance, 2,2-dimethylol propionic acid (hereinafter abbreviated as DMPA), 2,2-dimethylol butanoic acid, 2,2-dimethylol heptanoic acid, 2,2-dimethylol octanoic acid, etc.], (a414) compounds having another anionic group and an active H group:

bis(2-hydroxyethyl) phosphate, amino acids (2-amino ethane acid, etc.), and salts of the same, such as salts of the same with tertiary amines [trialkylamines having an alkyl group with 1 to 18 carbon atoms [trimethylamine, triethylamine (hereinafter abbreviated as TEA), dimethylethylamine, diethyloctylamine, etc.], and alkanolamine], salts of the same with morpholine, and/or salts of the same with alkali metals (salts of the same with sodium, potassium, lithium, etc.).

Examples of the compounds (a42) having a cationic group and an active H group include diols containing a quaternary ammonium salt group, diols containing a tertiary amino group, and salts of the same (salts of carboxylic acid, etc.), examples of which include: alkyl (C: 1 to 8) dialkanol (C: 2 to 4) amine (e.g., N-methyldiethanolamine), dialkyl (C: 1 to 6) alkanol (C: 2 to 4) amine (e.g., N,N-dimethylethanolamine), and neutralized products obtained by neutralization with acids of the foregoing compounds [organic acids such as carboxylic acids having 1 to 8 carbon atoms (acetic acid, propionic acid, lactic acid, octanoic acid, etc.), sulfonic acids (toluenesulfonic acid, etc.); inorganic acids such as hydrochloric acid, sulfonic acid, phosphoric acid, etc.], and compounds quaternized by a quaternization agent [ester of sulfonic acid, ester of carboxylic acid, halides (dimethyl sulfate, dimethyl carbonate, methyl chloride, benzyl chloride, etc.) having an alkyl group or a benzyl group (C: 1 to 8), etc.].

Examples of the (a4) having a nonionic group as a hydrophilic group include PEG, polyethylene propylene glycol (Mn=100 to 3,000), and the like.

The nonionic (a4) and the anionic (a41) or cationic (a42) may be used in combination.

Among the (a4), the (a41) and the (a42) are preferred, among which the (a41), particularly the (a411) and (a413) and the combination of the same is further preferred. Diol sulfonate, sodium salt of dialkylol alkanic acid, or salts of tertiary amines are particularly preferred.

The content of the (a4) in an autoemulsifying-type (a) aqueous dispersion is preferably not less than 0.1% based on a weight of the (a), more preferably 0.5% to 30%. Particularly, in the case where the (a4) is a nonionic compound, the content is preferably 3% to 30% [in the case where the (p1) or the (p2) is used and a polyoxyethylene chain (the number of added moles: not less than 2) is contained therein, the weight of the same is included], more preferably 5% to 20%.

Further, in the case where the (a4) is an ionic compound, the content of the ionic group based on the weight of (a) (except for counter ions) is preferably 0.01% to 10%, more preferably 0.1% to 8%, particularly preferably 0.2% to 5%, which are, if converted into an equivalent, preferably 0.002 milli-equivalent per gram (hereinafter referred to as "milli-equivalent/g") to 2 milli-equivalent/g, more preferably 0.02 milli-equivalent/g to 1.8 milli-equivalent/g, particularly preferably 0.04 milli-equivalent/g to 1 milli-equivalent/g.

Particularly, in the case where the (a413) and/or the (a411) is used as the (a4), the ratio of $—COO^{—}$ and/or $—SO_3^{—}$ based on the weight of the (a) is preferably 0.01% to 8%, more preferably 0.2% to 5%.

As the active H component used in the reaction with the (a1), the another active H compound (a5), which is other than the (a2) to (a4), can be used as required. Examples of the (a5) include active H polyfunctional compounds (a51) and monofunctional compounds (a52). Examples of the (a51) include the above-described polyamines, and polyether polyamines [hydrides of cyanoalkylated (C: 2 to 4) compounds (cyanated-ethylated compounds, etc.) of the (p2) and/or the (a32)]. Examples of the (a52) include the above-described primary monoamines and secondary monoamines such as di-hydrocarbyl (alkyl, cycloalkyl, aryl, and/or aralkyl (C: 1 to 20)) amines (such as dibutyl amine) and AO adducts of the same, monohydric alcohols (alkanol (C: 1 to 20), cyclohexanol, benzyl alcohol, etc.) and AO adducts of the same.

In the production of the (a), the order of the reactions of the foregoing components is not particularly limited, and examples of the production method include a method in which the (a1) and all the active H components are caused to react simultaneously, and a method in which after the (a1) and the (a2), as well as the (a3) as required, are caused to react simultaneously, the (a4) is caused to react with the same as required. The reaction temperature is normally 30° C. to 100° C., preferably 40° C. to 80° C.

Further, in the production process of the (a), it is preferable to use no solvent.

The amount of a solvent that is allowed to be mixed therein is normally not more than 5,000 ppm based on the weight of the (a), preferably not more than 2,000 ppm, and further preferably no solvent is contained, taking the flammability, and the safety to the human body and the environment into consideration. Examples of a solvent allowed to be contained therein include hydrophilic organic solvents that are substantially non-reactive with an isocyanate group, such as ketone-based solvents (acetone, methyl ethyl ketone, etc.), N-methyl pyrrolidone (hereinafter abbreviated as NMP), dimethyl formamide, tetrahydrofuran, and dioxane.

The equivalent ratio of NCO group/active hydrogen for reaction is preferably 1.3 to 2.2, and more preferably 1.4 to 2.0. In the case where the equivalent ratio is not less than 1.3, the (a) does not have an excessively high molecular weight, and hence, does not have a high viscosity. Further, in the case where the equivalent ratio is not more than 2.2, non-reacted isocyanate groups in the (a) decreases, which is preferable from the viewpoint of stability.

Further, the content of non-reacted isocyanate groups in the (a) produced is normally 0.5% to 10%, preferably 1.5% to 6%.

Still further, the (a) has a viscosity at 60° C. of, preferably, 20 Pa·s to 1,000 Pa·s, further preferably 20 Pa·s to 800 Pa·s. In the case where the viscosity at 60° C. is 20 Pa·s to 1,000 Pa·s, the mixing of the (a) and water in a continuous mixer that will be described later is eased.

It should be noted that the viscosity of the (a) is measured by a BH-type viscometer, and a viscosity of the (A) or (B) that will be described later is measured by a BL-type viscometer (60 rpm).

Isocyanate Group Terminated Prepolymer Aaqueous Dispersion (A)

The (A) of the present invention is obtained by subjecting the above-described (a) and water to contact mixing (with use of an emulsifier as required) so that the (a) is emulsified and dispersed.

Since the (a) of the present invention has a high viscosity, a kneader used for producing the (A) has an operation power of, preferably, not less than 20 $KW/m^3$, more preferably not less than 500 $KW/m^3$, particularly preferably not less than 2,000 $KW/m^3$. A kneader that exhibits an operation power of less than 20 $KW/m^3$ either is completely incapable of kneading the (a) or often stops in midstream of the kneading operation. The kneading temperature is normally 20° C. to 80° C., preferably 30° C. to 70° C., and the viscosity of the (a) at a temperature in the foregoing range is preferably 20 Pa·s to 10,000 Pa·s, more preferably 50 Pa·s to 2,000 Pa·s, particularly preferably 100 Pa·s to 1,000 Pa·s.

The operation power is defined as a value obtained by subtracting a value of a driving power during a no-load operation from a value of a driving power during a kneading operation (normally derived from a current value and a voltage during an operation) and dividing the subtraction result by a capacity of the kneader. With the use of a kneader that can exhibit an operation power of not less than 20 $KW/m^3$, a high-concentration aqueous dispersion is produced easily, and is pulverized finely. The kneader may be a batch type or a continuous type, but from the viewpoint of productivity, the continuous-type kneader is preferred.

Examples of a continuous kneading machine that can exhibit an operation power of not less than 20 $KW/m^3$ include the following fixed-container horizontal-axis-type continuous kneading machines, described in "*Kongo Konren Gijutsu* (Mixing and Kneading Technologies)" edited by The Association of Powder Process Industry and Engineering, published by The Nikkan Kogyo Shimbun, Ltd., Apr. 30, 1987, 250 pages, or "*Konren Sochi* (Kneading Machines)" written by Kenjiro HASHIMOTO, edited by *Kagaku Gijutsu Sogo Kenkyusho* (Research Institute for Science and Technology), Sep. 20, 1989, 224 pages.

(i) continuous kneader ("KRC kneaders" manufactured by Kurimoto, Ltd.);

(ii) taper roll (manufactured by Hitachi, Ltd.);

(iii) extruder (manufactured by Ikegai, Ltd., Toshiba Machine Co., Ltd.);

(iv) single-axis screw extruder (manufactured by Hosokawa Iron Works (currently, Hosokawa Micron Corporation));

(v) "Ko-kneader"-type screw extruder (manufactured by Yashima Bussan Co., Ltd.)

(vi) votator-type kneader (manufactured by Sakura Seisakusho, Ltd.)

These kneaders radiate less heat at the time of kneading, and do not adversely affect the aqueous dispersion. Considering this point, these are more preferable as compared with a rotor/stator dispersing machine, etc., used in the production of the (B) that will be described later.

Among these, the (i) and (ii) are further preferred, which are multiaxial with two or three axes and are excellent in self-cleaning.

Examples of the process of contact mixing include a process (1) in which the (a) is fed to a continuous kneader with a pump, and water or an aqueous solution of an emulsifier is fed continuously or intermittently to a midpoint of a path of the kneader by using a pump, so that contact mixing is achieved, and a process (2) in which water or an aqueous solution of an emulsifier is fed to a continuous kneader by using a pump, and the (a) is fed to a midpoint of a path of the kneader by using a pump, so that contact mixing is achieved. The process (1) is preferred.

The temperature of the (a) fed to the kneader is preferably 40° C. to 100° C., and more preferably 50° C. to 90° C. At a temperature of not lower than 40° C., the (a) does not have an excessively high viscosity, whereby the emulsifying dispersion is facilitated. On the other hand, at a temperature of not higher than 100° C., the stability of the (a) hardly deteriorates.

Further, the temperature of water or the aqueous solution of an emulsifier is preferably 10° C. to 50° C., and more preferably 20° C. to 40° C. At a temperature of not lower than 10° C., the contact mixing is facilitated. On the other hand, at a temperature of not higher than 40° C., a chain extension reaction due to water is not accelerated. With this, in a subsequent process of the production of a polyurethane resin aqueous dispersion (B), deviation from a molar ratio of an amine used in the chain extension reaction is suppressed, whereby a (B) with excellent properties can be obtained more easily.

The time of dispersion in a continuous kneader (a residence time in the kneader) is normally 1 to 300 seconds, and preferably 3 to 100 seconds. In the case of 1 to 300 seconds, a stable dispersion is obtained. The flow rate of the sum of the (a) and water passing through the kneader is normally 10 L/hr to 4,000 L/hr, preferably 20 L/hr to 3,000 L/hr.

The amount of an emulsifier used is preferably not more than 10% based on the weight of the (a), more preferably not more than 5%, further more preferably not more than 2%. Particularly preferably, no emulsifier is used. It is preferable that the emulsifier is not used, since in this case, paints, adhesives, and the like obtained from the polyurethane resin aqueous dispersion (B) tend to have excellent waterproofness and physical properties.

Examples of the emulsifier include anionic, cationic, nonionic, and amphoteric surfactants, polymer-type emulsifiers, and combinations of two or more of the same, for instance, those described in U.S. Pat. No. 3,929,678 and U.S. Pat. No. 4,331,447.

Examples of the anionic surfactant include the following surfactants having hydrocarbon groups having 8 to 24 carbon atoms:

ether carboxylic acids and salts of the same [sodium lauryl ether acetate, sodium (poly)oxyethylene lauryl ether acetate, etc.];

sulfic esters or ether sulfuric esters, and salts of the same [sodium lauryl sulfate, sodium (poly)oxyethylene lauryl sulfate, triethanolamine (poly)oxyethylene lauryl sulfate, sodium (poly)oxyethylene coconut oil fatty acid monoethanol amide sulfate, etc.];

salts of sulfonic acid [sodium dodecylbenzene sulfonate, etc.];

salts of sulfosuccinic acid, phosphoric ester or ether phosphoric ester, and salts of the same [sodium lauryl phosphate, sodium (poly)oxyethylene lauryl ether phosphate, etc.];

salts of fatty acids [sodium laurate, triethanolamine laurate, etc.]; and salts of acylated amino acids [sodium coconut oil fatty acid methyltauride, sodium coconut oil fatty acid sarcoside, triethanolamine coconut oil fatty acid sarcoside, triethanolamine N-coconut oil fatty acid acyl-L-glutamate, sodium N-coconut oil acid acyl-L-glutamate, sodium lauroyl methyl-β-alanide, etc.].

Examples of the nonionic surfactants include:

AO adducts of aliphatic alcohols (C: 8 to 24) [polyoxyethylene (the number of added moles of EO:18) cetyl ether, polyoxyethylene (the number of added moles of EO:11) lauryl ether, etc.];

polyhydric alcohol fatty acid (C: 8 to 24) esters [glycerol monostearate, sorbitan monolaurate, etc.];

aliphatic acid (C: 8 to 24) alkanolamide [1:1-type coconut oil fatty acid diethanolamide, 1:1-type lauric acid diethanolamide, etc.];

(poly)oxyalkylene alkyl (C: 1 to 22) phenyl ethers;

(poly)oxyalkylene (C: 2 to 8) alkyl (C: 8 to 24) amines; and alkyl (C: 8 to 24) dialkyl (C: 1 to 6) amine oxide [lauryl dimethyl amine oxide, etc.].

The nonionic surfactant preferably has a HLB of 8 to 20, more preferably, 10 to 18. The HLB in the present invention is a value derived from the Griffin equation shown below, which is described in "*Shin Kaimen Kasseizai Nyumon* (New Surfactant Primer) written by Takehiko FUJIMOTO, published by Sanyo Chemical Industries Co., Ltd., 1992, page 128:

$$HLB=(wt\ \%\ of\ hydrophilic\ group)\times(1/5)$$

Examples of the cationic surfactant include: quaternary ammonium salt-type [stearyl trimethyl ammonium chloride, behenyl trimethyl ammonium chloride, distearyl dimethyl ammonium chloride, lanolin fatty acid aminopropyl ethyl dimethyl ammonium ethylsulfate, etc.], and amine salt-type [salt of diethyl aminoethylamide lactic acid stearate, salt of dilaurylamine hydrochloric acid, salt of oleylamine lactic acid, etc.]. Examples of the amphoteric surfactant include betaine-type amphoteric surfactants [betaine coconut oil fatty acid amide propyl dimethylamino acetate, betaine lauryl dimethylamino acetate, betaine 2-alkyl-N-carboxymethyl-N-hydroxyethyl imidazolinide, lauryl hydroxysulfobetaine, sodium lauroylamide ethyl hydroxyethyl carboxymethyl betaine hydroxypropyl phosphate, etc.], and amino acid-type amphoteric surfactants [sodium P-lauryl aminopropionate, etc.].

As the polymer emulsifier, the following can be used: polyvinyl alcohol, starch, and derivatives of the same; cellulose derivatives such as carboxymethyl cellulose, methyl cellulose, and hydroxyethyl cellulose; carboxyl group-containing (co)polymers, such as sodium polyacrylate, having Mn of 1,000 to 50,000; and polymer-type emulsifiers having a urethane bond or an ester bond described in the specification of U.S. Pat. No. 5,906,704 [e.g., polycaprolactone polyol (p12) and polyether diol (p2) bonded by polyisocyanate (a1)]. The Mn of these polymer-type emulsifiers is normally 3,000 to 1,000,000, preferably 5,000 to 100,000.

In the case where an emulsifier is used, the nonionic surfactants, the anionic surfactants, and combinations of the same are preferred from the viewpoint of the emulsification dispersion stability of an aqueous dispersion, among which the nonionic surfactants further are preferred.

Polyurethane Resin Aqueous Dispersion (B)

The (B) according to another embodiment of the present invention is obtained by a chain extension reaction of the (A). Examples of an applicable chain extender (E) include aqueous liquids of polyamine (E1) [an aqueous liquid containing an aqueous solution, or water and the above-described aqueous solvent, in a range of not more than 5,000 ppm based on the weight of the (a), among which the aqueous solution is preferred], and water.

Examples of the (E1) include:

aliphatic polyamines (E11) [aliphatic diamine; alkylene diamine (C: 2 to 18) such as ethylene diamine (EDA), tetramethylene diamine, and hexamethylene diamine, as well as polyalkylene (C: 2 to 6) polyamine (having 3 to 25 amino groups) and alkyl (C: 1 to 8)-substituted derivatives of the same, such as diethylene triamine, triethylene tetramine, and tetraethylene pentamine], alicyclic polyamines (E12) [4,4'-diaminodicyclohexyl methane, 1,4-diaminocyclohexane, isophorone diamine (IPDA), etc.]

aliphatic polyamines having an aromatic ring (E13) [xylylene diamine, tetramethyl xylylene diamine, etc.], aromatic polyamines (E14) [4,4'-diaminodiphenyl methane, tolylene diamine, diethyl tolylene diamine, etc.], heterocyclic polyamines (E15) [piperazine, aminoethyl piperazine, etc.], alkanol amines (E16) [monoethanol amine, diethanolamine, 2-amino-2-methyl propanol, etc.], hydrazines (hereinafter abbreviated as HDH) and hydrazine derivatives (E17) [carbodihydrazide, adipic acid dihydrazide, etc.].

Among those listed as the (E), the aqueous liquids of the (E1) are preferred considering their high rate of reaction, among which the (E11), (E12), (E17), and combinations of two or more of the same further are preferred considering the ease of control of the molecular weight of a polyurethane resin to be produced.

The equivalent ratio of the sum of the primary and secondary amino groups of the (E1), i.e., ($NH_2$+NH) with respect to the isocyanate groups of the (a), i.e., [($NH_2$+NH)/NCO] is normally 0.2 to 0.9, and preferably 0.3 to 0.8. In the case where the ratio is not less than 0.2, carbon acid gas is generated mildly in the chain extension reaction process, whereby particles of a polyurethane resin tend to be made finer. In the case where the ratio is not more than 0.9, the molecular weight control of a polyurethane resin to be produced is facilitated.

The concentration of the (E1) in the case where an aqueous liquid of the (E1) is used is preferably 0.5% to 20%, more preferably 0.5% to 10%.

In the case where a terminating agent is used, monohydric alcohols (methanol, isopropanol, and butanol, etc.) having 1 to 6 carbon atoms, the above-described monoamines, or the like may be used, and in this case, the equivalent ratio of the terminating agent is 0.02 to 0.2 with respect to NCO.

The production of the (B) in the present invention can be achieved by mixing the (A) and the (E) which causes a chain extension reaction of the (A).

The operation power of a mixing dispersing machine that can be used for mixing the (A) and the (E) is not particularly limited. The following mixing dispersing machines can be used:

(i) rotor/stator dispersing machine: ("Ebara Milder MDN-303V" manufactured by Ebara Corporation, "CAVITRON CD-1010" manufactured by Nittetsu Mining Co., Ltd., "KORUMA DISYO 60" manufactured by Fuji Gokin Tekko KYK., "SUPER-DISPAX SD41" manufactured by IKA WORKS, INC., etc.);

(ii) ultrasonic vibration dispersing machine ("Ultrasonic Homogenizer RUS-600" manufactured by Nihon Seiki Seisakusho K.W, "T.K. Micromizer UJ-20" manufactured by Thkushu Kika Kogyo Co., Ltd., etc.);

(iii) high-pressure impact dispersing machine ("Gauhin Homogenizer 15M model" manufactured by Mount Gaulin Laboratory Co., "Microfluidizer M110 ET model" manufactured by Mizuho Industrial Co., Ltd., "T. K. Nanomizer" manufactured by Thkushu Kika Kogyo Co., Ltd., etc.); and (iv) vibration dispersing machine ("VIBRO MIXER" manufactured by REIKA Co., etc.)

Among these dispersing machines, the (i) and (iv) are preferred for continuous production, among which the (i) is particular preferred since it is scaled up easily.

The method for mixing and dispersing the (A) and (E) of the present invention is not particularly limited, and examples of the method include:

(1) feeding the (A) to a dispersing machine, and feeding the (E) to a midpoint of a path of the dispersing machine by using a pump so that they are mixed, (2) bringing the (A) and (E) into contact at an inlet of a dispersing machine and feeding the same into the dispersing machine so that they are mixed, and (3) feeding the (E) to a dispersing machine by using a pump, and feeding the (A) to a midpoint of a path of the dispersing machine so that they are mixed.

Among these, the methods (1) and (2) are preferred.

The conditions under which the (A) and (E) are mixed are as follows, in the case where, for instance, the method (1) is applied: the number of revolutions of the dispersing machine is preferably 2,000 rpm to 14,000 rpm, more preferably 3,000 rpm to 12,000 rpm. The time of dispersion (residence time) is preferably 0.5 to 30 seconds, more preferably 3 to 20 seconds. The flow rate of a liquid in a dispersing machine is preferably 10 L/hr to 6,000 L/hr, more preferably 20 L/hr to 4,000 L/hr.

Further, the temperature of the (E) is normally 10° C. to 60° C., preferably 20° C. to 50° C. The viscosity of the (B) (at 25° C.) is preferably 0.01 Pa·s to 3 Pa·s.

The content of the surfactant in the (B) is normally not more than 10%, preferably not more than 5%, and more preferably not more than 2% based on the weight of the (a), and it is particularly preferable that no surfactant is contained. It should be noted that the limitation on the content of a surfactant in the foregoing range applies also to the content thereof based on the weight of the (b). A smaller content of a surfactant is preferable since better waterproofiess is imparted to a paint or the like in which the (B) is used. The surfactant content can be measured by the same method as that for the (A).

The content of a solvent in the (B) is normally not more than 5,000 ppm, preferably not more than 3,000 ppm, more preferably not more than 1,000 ppm based on the weight of the (a), and it is particularly preferable that no solvent is contained. It should be noted that the content of a solvent in the (B) based on the weight of the (b) is in substantially the same range as the above range. With a smaller content of a solvent, the (B) and a sheet material or the like in which the (B) is used exhibit less flammability at the time of production, excellent safety to the human body, and smaller impact on the environment. The solvent content can be measured by the same method as the above method in the case of the (A).

The (B) contains the (b), the content of the (b) being in a range of 20% to 65%, preferably in a range of 40% to 60%.

It is preferable that the content of the (b) is not less than 20%, since in this case a paint or the like obtained from the (B) is imparted with a high drying rate.

The average particle diameter of the (b) in the (B) is substantially the same as the particle diameter of the (a), and the (b) preferably has an average particle diameter of 30 nm to 500 nm, more preferably 30 nm to 300 nm. A content of particles of the (b) having a particle diameter of not less than 5,000 nm in the (B) preferably is not more than 1 vol %, more preferably not more than 0.3 vol %. This is preferred since particles with a particle diameter of not less than 5,000 nm are not more than 1 percent, particles that settle are few, whereby the (B) are imparted with excellent storage stability.

The (B) of the present invention is applicable for the use in paints, coating materials, adhesives, tackiness agents, fiber-treating agents, and sheet materials that will be described below.

Paints, Coating Materials

The (B) of the present invention can be used as a binder component in a paint (a coating material), and is used normally in an aqueous paint.

A crosslinking agent can be contained in a paint with a view to improving properties of a paint film. Examples of the crosslinking agent include the following (x1) to (x4):

(x1) watersoluble or water-dispersible amino resins such as melamine resins containing an (alkoxy)methylol group and/or an imino group, and urea resins having the same groups [melamine resins having a methylol group and/or an imino group are preferred];

(x2) water-soluble or water-dispersible polyepoxides, such as glycidyl ethers such as bisphenol A glycidyl ether, hydrogenated bisphenol A glycidyl ether, and glycidyl ethers of polyols [the above-described (a31) (ethylene glycol, glycerin, trimethylol propane, sorbitol, etc.), and AO (C: 2 to 3) adducts of the same (PEG, etc.)], and polyepoxides imparted with water-dispersibility by adding an emulsifier (such as the aforementioned surfactants, etc.) thereto, and the like [glycidyl ethers of polyhydric alcohols are preferred, among which sorbitol poly(di to hexa)glycidyl ethers and glycerin poly(di or tri)glycidyl ethers are particularly preferred];

(x3) water-soluble or water-dispersible polyisocyanate compounds such as polyisocyanates having a hydrophilic group (a polyoxyethylene chain, etc.) in each molecule ["CORONATE 3062" and "CORONATE 3725" (manufactured by Nippon Polyurethane Industry Co., Ltd.), etc.], and blocked polyisocyanates [the above-described (a1) (isocyanurate-modified IPDI, etc.) blocked by using blocking agents (phenols disclosed in the specification of U.S. Pat. No. 4,524,104, active methylene compounds, lactam, oxime, bisulfite, tertiary alcohols, aromatic secondary amines, imides, or mercaptans such as phenol, methyl ethyl ketone (MEK), ϵcaprolactone, etc.)]; and (x4) polyethylene ureas (diphenylmethane-bis-4,4'-N,N'-ethylene urea, etc.), and the like.

The amount of a crosslinking agent to be added is normally 0% to 30%, preferably 0.1% to 20%, based on a weight of the (b) in the (B).

In the case of a paint, other additives may be added as required. For instance, one or two, or more of pigments, pigment dispersers, viscosity regulators, antifoaming agents, leveling agents, preservatives, deterioration inhibitors, stabilizers, and freezing inhibitors may be added.

Examples of the pigments include:

inorganic pigments such as white pigments (titanium white, hydrozincite, lithopone, white lead, etc.), transparent white pigments (calcium carbonate, barium sulfate, calcium silicate, etc.), black pigments (carbon black, animal black, red lead, etc.), grey pigments (zinc dust, slate powder, etc.), red pigments (red iron oxide, red lead, etc.), brown pigments (amber, iron oxide powder, Vandyke brown, etc.), yellow pigments (chrome yellow, zinc chromate, yellow iron oxide, etc.), green pigments (chromium green, chromium oxide, viridian, etc.), blue pigments (ultramarine blue, iron blue, etc.), violet pigments (Mars violet, cobalt violet light, etc.), metallic pigments (aluminum flake, copper bronze flake, micaceous iron oxide, mica flake, etc.);

organic pigments such as natural organic pigments (cochineal lake, madder lake, etc.); and synthetic organic pigments such as nitroso pigments (naphthol green Y, naphthol green B, etc.), nitro pigments (naphthol yellow S, pigment chlorine, lithol fast yellow GG, etc.), pigment-type azo pigment (toluidine red, Hansa yellow, naphthol AS-G, etc.), azo lakes made of watersoluble dyes (Persian orange, ponceau 2R, Bordeaux B, etc.), azo lakes made of insoluble dyes (lithol red, bone maroon, red lake, etc.), lakes made of basic dyes (fanal color, etc.), lakes made of acid dyes (acid green lake, peacock blue lake, etc.), xanthan lakes (eosin, etc.), anthraquinone lakes (alizarin lake, purpurin lake, etc.), pigments made of vat dyes (indigo, argon yellow, etc.), and phthalocyanine pigments (phthalocyanine blue, phthalocyanine green, etc.).

Examples of the pigment dispersers include various types of surfactants listed above as emulsifiers [anionic surfactants, cationic surfactants, nonionic surfactants, and amphoteric surfactants], and polymer emulsifiers (Mn=1,000 to 20,000).

Examples of the viscosity regulators include thickeners, such as inorganic viscosity regulators (sodium silicate, bentonite, etc.), cellulose-based viscosity regulators (methyl cellulose, carboxymethyl cellulose, hydroxymethyl cellulose, etc., having Mn of 20,000 or more normally), protein-based viscosity regulators (casein, casein soda, casein ammonium, etc.), acrylic viscosity regulator (sodium polyacrylate, ammonium polyacrylate, etc., having Mn of 20,000 or more normally), and vinyl-based viscosity regulators (polyvinyl alcohol, etc., having Mn of 20,000 or more normally). Acrylic viscosity regulators and vinyl-based viscosity regulators are preferred.

Examples of the antifoaming agents include long-chain alcohols (octyl alcohol, etc.), sorbitan derivatives (sorbitan monooleate, etc.), and silicone oil (polymethyl siloxane, polyether-modified silicone, fluorine-modified silicone, etc.). Examples of the preservatives include organic nitrogen sulfur compound-based preservatives, organic sulfur halogen compound-based preservatives, etc. Examples of the deterioration inhibitors and the stabilizers (UV absorbers, antioxidants, etc.) include hindered phenol-based agents, hindered amine-based agents, hydrazine-based agents, phosphorus-based agents, benzophenone-based agents, benzotriazole-based agents, etc. Examples of the freezing inhibitors include EG, PG, etc.

The amounts to be used of these components vary with the purpose of use, but generally, in the case of a pigment-based paint, it includes the (B) of 10 to 300 parts (solid matters: components other than the aqueous solvent, this also applies hereinafter), a viscosity regulator of 0 to 5 parts, an antifoaming agent of 0 to 6 parts, a preservative of 0 to 5 parts, a deterioration inhibitor or stabilizer of 0 to 5 parts, and a freezing inhibitor of 0 to 5 parts, with respect to 100 parts of a pigment. In the case of a clear-type paint, generally it includes an antifoaming agent of 0 to 3 parts, a preservative of 0 to 3 parts, a UV absorber of 0 to 3 parts, and a freezing inhibitor of 0 to 8 parts, with respect to 100 parts (solid matters) of the (B).

The pigment-type aqueous paint can be produced by, for instance, mixing a dispersing agent for a pigment in the (B)

of the present invention, adding a pigment thereto so that the pigment is dispersed, adding other additives as required, and filtering the same so that non-dispersed substances are removed. For the foregoing dispersion, a dispersing machine (an atomizer mill, a beads mill, a three-roll mill, a ball mill, etc) can be used.

The paint made of the (B) of the present invention can be coated by a usual painting means (spray painting, brush painting, roll painting, etc.). The viscosity of the paint is selected appropriately according to the painting method. For instance, in the case of spray painting, the viscosity is preferably 20 mPa·s to 50 mPa·s at a shear rate of $1000s^{-}$, and 180 mPa·s to 280 mPa·s at a shear rate of $10s^{-1}$. In the case where a paint has a viscosity of not more than 50 mPa·s at a shear rate of $1000s^{-1}$, the paint easily is jetted by a spray, while in the case where a paint has a viscosity of not less than 180 mPa·s at a shear rate of $10s^{-1}$, the paint does not tend to sag. These viscosities are measured by using a High Shear Viscometer ("HSV-2" manufactured by Nippon Seiki Co., Ltd.).

The paint made of the (B) of the present invention can be applied directly or via a primer over an item to be coated, and can be applied in a single layer or in multiple layers (2 to 8 layers) through repeated coating steps. The paint can be used as any one of a primer, an intermediate coat, and a topcoat. Examples of the item to be coated include wood, paper, leather, metals (aluminum, iron, copper, various alloys, etc.), plastics (vinyl chloride-based resins, acrylic resins, styrene-based resins, etc.), and inorganic materials (concrete, slate, calcium silicate plates, etc.). Examples of a form of the item to be coated include films, fibers, non-woven fabrics, sheets, plates, bars, pipes, blocks, various molded products, built products, etc.

The paints made of the (B) of the present invention suitably are applied in various paints and coating agents (topcoats, intermediate coats, and primers for automobiles, paints for construction materials, anticorrosive coatings for metals and the like, mar-proof coatings for metals, resins, and the like, water-proof coatings, solvent-resistant coatings, and moisture-proof coatings for paper, leather, and the like, and polishing coatings for floors, etc.), and various binders (binders for automobile paints, binders for exterior paints, binders for enamel paper, binders for ceramics, etc.). The amount of a paint to be applied varies with the use and purpose, but normally it is 0.5 to 1000 $g/m^2$, preferably 1 to 300 $g/m^2$ in the form of an aqueous paint itself (in a wet state).

The drying after coating is performed under a condition of approximately normal temperature to 200° C. The method for drying is not particularly limited, and for instance, hot-air, infrared radiation, and electric heaters can be used.

Adhesives

The (B) of the present invention can be used as a main component in an adhesive.

A crosslinking agent can be added to an adhesive with a view to causing the adhesion function to be delivered more efficiently. Besides, other additives such as a pigment, a dispersing agent for a pigment, a viscosity. regulator, a stabilizer, a preservative, and a freezing inhibitor may be added thereto as required. Examples of the crosslinking agent and the additives include the same ones as those listed above regarding the above-described paints.

The amount of the added crosslinking agent is normally 0% to 100%, preferably 3% to 30% with reference to the weight of the (b) in the (B). In the case where the crosslinking agent is not less than 3%, sufficient adhesion strength and durability are obtained, and in the case where it is not more than 30%, items to be bonded do not become-brittle, which is preferable. The method for mixing the (B) and the crosslinking agent is not particularly specified, and examples of the method include a mixing method by normal stirring, a mixing method using a mixer (a paint conditioner, a ball mill, a kneader, a sand grinder, a flat stone mill, etc.).

Examples of means for applying an adhesive to items to be bonded include brushing, rolling, spraying, flow coat, and immersion. The bonding can be performed by applying an adhesive to one of items to be bonded, and attaching the same in the as-is state (without being dried) to the other item to be bonded (wet bonding), or attaching the item after being dried to the other item (dry bonding) and hardening the adhesive layer. Alternatively, the bonding may be achieved by interposing a dried adhesive film between the items to be bonded and hardening the same. The hardening can be achieved by curing the adhesive at normal temperature or an increased temperature (for instance, approximately 60° C. to 80° C.), or alternatively, by curing the same at normal temperature and thereafter increasing the temperature to approximately 60° C. to 80° C. so as to accelerate the hardening.

The items to be bonded are not limited particularly, and the adhesives can be applied widely to substrates of various materials such as wood, resin films, rubber, leather, paper, metals, etc.

The adhesives made of the (B) of the present invention are suitably applied in, for instance, woodworking adhesives, metalworking adhesives, adhesives for use with plastics, adhesives for use with substrates for electronic apparatuses, and adhesives for use with fabrics.

Fiber-treating Agents

The (B) of the present invention can be used widely in fiber-treating binders (binders for pigment print, binders for use with non-woven fabrics, binders for the bundling of reinforcing fibers, binders for use in antimicrobial agents, etc.), and fabric coatings (waterproof coatings, water-repellent coatings, soil-resistant coatings, etc.).

In the case where the (B) is used as the pigment-print binders, one or two, or more of an emulsifier, a stabilizer (UV absorber, antioxidant, etc.), a thickener, a film-forming assistant, and other assistants can be added to the (B) as required. Examples of the emulsifier include the same ones as the emulsifiers listed above. The anionic surfactants and nonionic surfactants are preferred particularly. Examples of the stabilizer and the thickener include the same ones as those listed above regarding the paints. Examples of the film-forming assistant include N-methyl-2-pyrrolidone, etc. Examples of the other assistants include printability-imparting agents, antigumming agents, etc.

The pigment textile-printing can be performed by printing fabrics in the same way as that for normal pigment print. More specifically, for instance, a printing paste is prepared by mixing a color paste (water and a pigment dispersed therein finely and homogeneously), the (B) of the present invention, a thickener, and other assistants, and subsequently, the printing paste is printed on a fabric. For the mixing, a paddle-type mixing vessel or the like is used. For the printing, an autoscreen textile-printing machine, a rotary screen textile-printing machine, a roller textile-printing machine, and the like can be used. As the fabric, fabrics of natural fibers (cotton, hemp, wool, silk, etc.), semi-synthetic fibers (rayon, acetate, etc.), synthetic fibers (polyester, polyamide, polyacrylonitrile, polyolefin, etc.) and the like can be used.

Examples of the reinforcing fibers subjected to the application of the (B) as a binder for the bundling of reinforcing fibers include inorganic fibers (glass fiber, carbon fiber, etc.), and high-strength organic fibers (polyamide fiber, polyester fiber, etc.).

In the case where the (B) of the present invention is used as a bundling agent for glass fiber, one or two, or more additives may be added to the (B) as required, examples of which include silane coupling agent (γ-aminopropylethoxysilane, γ-methacryloxy propyltrimethoxysilane, vinyl trichlorosilane, vinyl triethoxysilane, γ-glycidoxy propyltrimethoxysilane, etc.), lubricants (fatty acid amides, soap, etc.), antistatic agents (the surfactants described above, etc.), plasticizers (phthalic acid esters, adipic acid esters, etc.), and antifoaming agents (those described above).

The bundling agent may be used in combination with another bundling agent, examples of which include starch, processed starch, dextrin, amylose, gelatin, carboxymethyl cellulose, polyvinyl alcohol, polyvinyl pyrrolidone, polyvinyl acetate, aqueous polyester resins, aqueous epoxy resins, and aqueous acrylic resins. The (B) and arbitrary additives are mixed so that a treating liquid is prepared, and the liquid is applied to a fiber, and heated and dried as required so that it is fixed. For the mixing, a mixing vessel (paddle-type or the like) is used. The concentration of the treating liquid is normally 1% to 10%. The treating liquid is applied to fibers through roller coating, spray coating, impregnation coating, etc. The amount of the same adhering to fibers is normally 0.1% to 10%. Drying and fixing are performed with, for instance, hot air at 50° C. to 100° C.

In the case where the (B) is used as a binder for an antimicrobial agent or a coating, the additives, the concentration of a treating liquid, the means for application of the same to fibers, the amount of the same adhering to fibers, and treating conditions may be the same as those described above, and appropriately selected according to the purpose of use.

Sheet Materials

The (B) of the present invention can be used widely as a raw material for leatherlike sheet materials such as synthetic leathers and artificial leathers.

In the case where a leather-like sheet material is obtained through impregnating or coating a fabric material substrate with the (B) and causing heat-sensitive coagulation, a polyurethane resin aqueous dispersion (B1) for use in sheet materials that satisfy all the requirements (1) to (4) described below is applicable suitably as the (B):

(1) being composed of an anionic polyurethane resin (b1) having one or more groups selected from the group consisting of —$COO^-$group and —$SO_3^-$group, the group being preferably 0.01% to 8% based on a weight of the polyurethane resin;

(2) containing a nonionic surfactant (C) having a HLB of 10 to 18, the surfactant being preferably 0.1% to 10% based on the weight of the polyurethane resin;

(3) containing an inorganic salt (D) of preferably 0.1 wt % to 10 wt %;

(4) either not containing a solvent, or containing a solvent of not more than 5,000 ppm based on the weight of the polyurethane resin.

The lower limit of the content of the at least one group selected from the group consisting of —$COO^-$group and —$SO_3^-$group, described in (1) above, is more preferably 0.3%, further more preferably 0.4%, and particularly preferably 0.5%, while the upper limit of the same is more preferably 6%, further more preferably 5%, and particularly preferably 4%. In the case where the content of the foregoing groups is not less than 0.01%, the aqueous dispersion exhibits particularly excellent storage stability, while in the case where the content is not more than 8%, a resin coating to be formed exhibits particularly excellent waterproofness.

Examples of the (C) include, among the nonionic surfactants, those having a HLB of 10 to 18. Among these, AO (C: 2 to 8) adducts of aliphatic alcohols are further preferred, and those expressed by the following general formula (1) are particularly preferred:

$$R—O—(CH_2CH_2O—)_x—H \quad (1)$$

where R represents a straight-chain or branched alkyl group or alkenyl group having 4 to 24 carbon atoms, and x represents an integer of 5 to 40, preferably 7 to 30.

Examples of the alkyl group include butyl group, isobutyl group, pentyl group, hexyl group, octyl group, nonyl group, decyl group, lauryl group, cetyl group, stearyl group, etc., while examples of the alkenyl group include octenyl group, decenyl group, dodecenyl group, oleyl group, etc. Among these, lauryl group, cetyl group, and oleyl group are preferred.

The lower limit of the content of the (C) is normally 0.1%, preferably 2%, and more preferably 4%, while the upper limit of the same is normally 10%, preferably 9%, and more preferably 8% based on the weight of the polyurethane resin. In the case where the content of the (C) is not less than 0.1%, coagulation at room temperature hardly occurs, whereby particularly excellent workability is exhibited, while in the case where the content is not more than 10%, quick heat-sensitive coagulation is exhibited. It should be noted that the content of the (C), which is in the range of 0.1% to 10%, is in the same range in the case where it is based on a weight of a prepolymer.

Regarding the use of the (C), it is more preferable to use a combination of two or more of the foregoing examples of the (C), for instance, a combination of a nonionic surfactant (C1) having a HLB of 14 to 18 and a nonionic surfactant (C2) having a HLB of not less than 10 and less than 14.

The lower limit of the HLB of the (C1) is normally 14, preferably 14.2, and particularly preferably 14.4, while the upper limit of the same is normally 18, preferably 17.8, and particularly preferably 17.6. In the case where the HLB of the (C1) is not less than 14, the aqueous dispersion exhibits particularly excellent storage stability (effect of allowing no coagulated matters to develop). On the other hand, in the case where the HLB is not more than 18, the aqueous dispersion exhibits a particularly excellent heat-sensitive coagulation property.

The lower limit of the HLB of the (C2) is normally 10, preferably 10.2, and particularly preferably 10.4, while the upper limit of the same is normally less than 14, preferably 13.8, and particularly preferably 13.6%. In the case where the HLB of the (C2) is not less than 10, coagulation at room temperature hardly occurs, whereby particularly excellent workability is exhibited, while in the case where the LHB of the same is less than 14, quick heat-sensitive coagulation is exhibited.

Regarding the respective contents of the (C1) and the (C2), based on the weight of the polyurethane resin, the lower limit thereof is preferably 0.05%, more preferably 1%, and particularly preferably 2%, while the upper limit of the same is preferably 9%, more preferably 8%, and particularly preferably 7%. The weight ratio of (C1)/(C2) is preferably 1/10 to 10/1, more preferably 2/8 to 8/2, particularly preferably 3/7 to 7/3.

Preferable examples of the (C1) are those having x in the formula (1) of 7 to 30, for instance, polyoxyethylene (degree of polymerization:11) lauryl ether (HLB=14.4: hereinafter abbreviated as LE11), polyoxyethylene (degree of polymerization:18) cetyl ether (HLB=15.0: hereinafter abbreviated as CE18), polyoxyethylene (degree of polymerization:24) cetyl ether (HLB=16.1: hereinafter abbreviated as CE24), and polyoxyethylene (degree of polymerization:18) oleyl ether (HLB=15.1: hereinafter abbreviated as OE18), etc. Preferable examples of the (C2) are those having x in the formula (1) of 6 to 20, for instance, polyoxyethylene (degree of polymerization: 7) lauryl ether (HLB=12.4: hereinafter abbreviated as LE7), polyoxyethylene (degree of polymerization:9) lauryl ether (HLB=13.6: hereinafter abbreviated as LE9), polyoxyethylene (degree of polymerization:7) oleyl ether (HLB=10.8: hereinafter abbreviated as OE7), etc.

The (C) may be added either during the production of the (A) or the polyurethane resin aqueous dispersion, or after the same, but it is preferable to add and mix the same after the production of the polyurethane resin aqueous dispersion from the viewpoint of the storage stability of the polyurethane resin aqueous dispersion.

The (B1) preferably contains an inorganic salt (D) so that the heat-sensitive coagulation property is imparted thereto.

Examples of the (D) include inorganic acid salts or halogenides of alkali metals or alkaline-earth metals. Examples of inorganic acid salts of alkali metals include sodium carbonate, sodium sulfate ($Na_2SO_4$), sodium nitrate, potassium carbonate, etc. Examples of halogenides of alkali metals include potassium chloride, lithium chloride, sodium chloride, etc. Examples of inorganic acid salts of alkaline-earth metals include calcium sulfate, magnesium sulfate, magnesium nitrate, calcium phosphate, etc. Examples of halogenides of alkaline-earth metals include calcium chloride ($CaCl_2$), magnesium chloride, etc.

Regarding the content of the (D), based on the weight of the polyurethane resin, the lower limit thereof is normally 0.1%, preferably 0.5%, and further preferably 1%, while the upper limit thereof is normally 10%, preferably 8%, and further preferably 6%. In the case where it is not less than 0.5%, particularly excellent effect of heat-sensitive coagulation is exhibited. Further, in the case where it is not more than 9%, particularly excellent storage stability is exhibited.

The (D) may be added either during the production of the polyurethane resin aqueous dispersion, or after the same, but it is preferable to add and mix the same after the production of the polyurethane resin aqueous dispersion from the viewpoint of the storage stability of the polyurethane resin aqueous dispersion.

Further, the (D) may be added in the as-is state or in a state of an aqueous solution of the same. Among these, the addition of the same in the aqueous solution state is preferred, and the addition of an aqueous solution containing the foregoing (C) and (D) is particularly preferred. The concentration of the (D) in an aqueous solution is not particularly limited as long as it is not higher than the solubility of the (D).

The (B1) either does not contain a solvent, or contains a solvent so that the content of the solvent is not more than 5,000 ppm, preferably not more than 3,000 ppm, based on the weight of the polyurethane resin, but more preferably no solvent is contained. It should be noted that regarding the specification of the content of the solvent, the same range applies to the content of a solvent based on the weight of a prepolymer.

To the (B1), the above-described colorants, UV absorbers, antioxidants, crosslinking agents, inorganic fillers, and known coagulation regulators [higher alcohols (for instance, decyl alcohol, dodecyl alcohol, cetyl alcohol, etc. described in JP-B-42(1967)-22719)] may be added as required. The sum of the additives is preferably not more than 5% based on the weight of the polyurethane resin.

The (B1) may be diluted with water so as to be suitable for the molding of a sheet material, in which the concentration of solid matters is preferably 5% to 40%, more preferably 10% to 30%.

The heat-sensitive coagulation temperature (T) [° C.] of the (B1) is preferably not lower than 40° C. from the viewpoint of the storage stability, and is preferably not higher than 80° C. with a view to preventing polyurethane resin from migrating to a surface of a fiber substrate upon drying with heat. The temperature is further preferably 50° C. to 70° C. The (T) in the present invention can be measured by the following method:

10 g of the (B1) diluted so that the concentration thereof is 20% is weighed in a test tube (internal diameter:18 mm), heated at a rate of 10° C./min in hot water bath at 90° C. without being stirred, and a temperature at which the foregoing aqueous dispersion loses flowability and becomes in a gel state is the temperature (T).

As a fiber material substrate used in a leather-like sheet material, known fiber materials such as non-woven fabrics and knitted or woven fabrics can be used.

The non-woven fabric may be a fabric with a knitted or woven fabric or the like laminated in the inside or on a surface thereof for reinforcement or other purposes. As a component fiber of the same, any of natural fibers and chemical fibers can be used. Examples of the natural fibers include cotton, wool, silk, and asbestos, and examples of chemical fibers include regenerated fibers such as rayon and "Tencel" (Lyocell), and semi-synthetic fibers such as acetate and triacetate, synthetic fibers such as polyamide, polyester, polyolefin, and acryl. Alternately, the foregoing fibers may be used in mixture.

The production of the leather-like sheet material of the present invention is performed normally through the step of impregnation or coating of the fiber material substrate with the (B1), the step of coagulation by heating, and the step of drying, which are carried out in the stated order.

After the impregnation or coating, a treatment such as washing with water may be performed as required. In the case of the impregnation, the impregnation may be followed by squeezing with a mangle or the like so that an adhering amount of the (B1) is adjusted. The coating is carried out by knife coating, air-knife coating, roll coating, spray coating, or the like. Examples of the method of coagulation by heating include (1) the heating coagulation method of blowing heated water vapor, and (2) the method of introducing the substrate with the (B1) into a drier in the as-is state so as to be coagulated by heating and dried at the same time.

The temperature for the heating coagulation in an actual process is required to be 10 or more degrees higher, preferably 20 or more degrees higher, than the (T) of the (B1). By setting the temperature to 10 or more degrees higher than the (T), a further improved migration preventing effect can be achieved.

The temperature for the heating coagulation and the drying is preferably 50° C. to 150° C., and more preferably 60° C. to 140° C. After the heating coagulation, a treatment such as washing with water may be performed as required.

The ratio of solid matters of the (B1) adhering to the fiber material substrate after drying is preferably 3 parts to 150 parts, and more preferably 20 parts to 120 parts with respect to 100 parts by weight of the fiber material substrate.

The sheet materials of the present invention have appropriate flexibility and excellent texture similar to natural leather, and hence, they are of significant use as leather-like sheet materials.

The sheet materials of the present invention can be used suitably for various purposes, for instance, mattresses, linings of bags, clothes, core materials for shoes, textiles for cushions, interior materials for automobiles, materials for wall coverings, etc.

EXAMPLES

The following more specifically describes the present invention by way of examples, but the present invention is not limited thereto.

It should be noted that a kneader I used in Examples and Comparative Examples described below was a fixed-container horizontal-axis continuous kneader ("KRC kneader S5" manufactured by Kurimoto, Ltd., maximum operation power:16,000 KW/m$^3$), and a kneader II was a rotor/stator dispersing machine ("Ebara Milder MDN-303V" manufactured by Ebara Corporation, maximum operation power:1,000 KW/m$^3$).

The conditions of gas chromatography in measuring the content of a solvent were as follows:

Device: "GC-14B" manufactured by Shimadzu Corporation

Column:2m packed column filled with polyethylene glycol 20M (manufactured by Shinwa Chemical Industries, Ltd.)

Column temperature: retention at 60° C. for 10 minutes, then, heating at a rate of 10° C./min, and retention at 180° C. for 30 minutes.

Internal standard: dioxane or acetone

Injection temperature:250° C.

Detector temperature:250° C.

Production Examples 1 to 6

Production of the Prepolymers (a)

According to the formulations (parts) shown in Table 1, raw material components were put in a stainless autoclave equipped with a thermometer, an agitator, and nitrogen blowing pipe. After substitution with nitrogen, the components were caused to react under the conditions of the temperatures and reaction times shown in Table 1 while being agitated, whereby isocyanate group-terminated prepolymers (a-1) to (a-6) were obtained. Viscosities and NCO contents (%) of the same are shown in Table 1.

Examples 1 to 5, Comparative Examples 1 to 4

Prepolymer Aqueous Dispersions

Kneaders and raw materials shown in Table 2 and 3 were used. The (a) whose temperature was adjusted to 50° C. in an autoclave was fed to the kneader by using a gear pump, while a dispersion medium (water or surfactant aqueous solution) at 20° C. was fed from another tank to the kneader by using a diaphragm pump, at a flow rate shown in Table 2 or 3, so that they were brought into contact and kneaded. By so doing, prepolymer aqueous dispersions (A-1) to (A-5), and (A-6x) to (A-9x) were obtained. The solid component concentrations, viscosities, average particle diameters, and contents of particles having sizes of not less than 5,000 nm, of the foregoing prepolymer aqueous dispersions are shown in Tables 2 and 3.

Examples 6 to 10, Comparative Examples 5 and 6

Polyurethane Resin Aqueous Dispersions

Prepolymer aqueous dispersions shown Tables 4 and 5, and an aqueous solution of the (E) whose temperature was adjusted to 30° C. were fed to the kneader II at a flow rate shown in Table 4 or 5 so that the amino groups (—$NH_2$) were 0.6 mole with respect to 1 mole of isocyanate groups (—NCO group) of the prepolymer (a), and were mixed by agitation at 6,000 rpm, whereby polyurethane resin aqueous dispersions (B-1) to (B-5), (B-6x) and (B-7x) were obtained.

Analyzed values, storage stability, and waterproofiess of films of the foregoing materials are shown in Tables 4 and 5.

Evaluation of Storage Stability:

An aqueous dispersion was left to stand in a 100-ml glass bottle at room temperature for three months, and the presence/absence of settling was determined by visual observation. "◎" indicates that no settling was observed. "○" indicates that a small amount of settling was observed but re-dispersed when the bottle was shaken. "x" indicates that settling was observed and did not re-disperse when the bottle was shaken.

Evaluation of Waterproofness:

The aqueous dispersion was coated over a glass plate so that it would have a film thickness of approximately 200 μm after being dried, and films obtained after drying at 25° C. for 24 hours, drying at 80° C. for 3 hours, and drying at 130° C. for 45 minutes were immersed in water at 25° C. for 48 hours. Changes in the appearance of the films were checked by visual observation. "◎" indicates that no change in an appearance was observed. "○" indicates that a slight change of whitening was observed. "x" indicates that peel-off and whitening occurred.

<Production of Non-woven Fabrics>

A laminate sheet was formed with a polyethylene terephthalate staple fiber, and the sheet was needle-punched at a rate of 280 needles per cm$^2$. and a non-woven fabric with a weight of 380 g/m$^2$ and an apparent density of 0.18 g/cm$^3$ was obtained.

Examples 11 to 13, Comparative Examples 7 to 10

Leather-like Sheet material

The samples of the (C) and (D) shown in Table 6 or 7, dissolved or dispersed in 20 parts of water, were mixed in 200 parts of the (B) shown in Table 6 or 7, and water further was added thereto so that the concentration was 25%, whereby urethane resin aqueous dispersions for sheet materials (B1-1) to (B1-3) and (B1-4x) to (B1-7x) were obtained. The heat-sensitive coagulation temperatures of these dispersions are shown in Tables 6 and 7. It should be noted that the comparative examples 7 and 9 coagulated immediately after the (B1-4x) and (B1-6x) were formed, and hence, their heat-sensitive coagulation temperature were not measured.

The above-described non-woven fabrics were immersed in the (B1) [except for the (B1-4x) and the (B1-6x)], and were squeezed with a mangle so that a ratio of solid portions adhering thereto was 50±2 wt % with respect to the weight of the non-woven fabric. Then, the fabrics were placed in saturated water vapor at 100° C. for 2 minutes so that heat-sensitive coagulation occurred, and subsequently dried at 100° C. for 20 minutes by a hot-air drier, whereby leather-like sheet materials were obtained.

The obtained sheet materials were evaluated by the following evaluation method, and the results of the evaluation are shown in Tables 6 and 7.

<Evaluation Method>

[Ratio of Resin Adhering to Fabric]

The ratio was calculated by the following formula regarding the leather-like sheet materials after drying.

$$100 \times \frac{(\text{weight of leather-like sheet}) - (\text{weight of fiber material substrate})}{(\text{weight of fiber material substrate})}$$

[unit: wt %]

[Presence/absence of Migration]

Cross-sections of sheets were observed by an electron microscope ("S-800" manufactured by Hitachi, Ltd.) so that adhesion of the polyurethane resins to surface portions and central portions thereof were checked. The sheets in which the polyurethane resin was distributed homogeneously in fiber material substrates, which means that migration did not occur, were evaluated as "○", and the sheets in which the polyurethane resin was unevenly distributed, mainly in the vicinities of surfaces of the fiber material substrates, which means that migration occurred, were evaluated as "x".

[Texture]

The sheets having texture like natural leather were evaluated as "○", those having flexibility slightly inferior to that of natural leather were evaluated as "Δ", and those which lacked flexibility and hence did not have texture like natural leather were evaluated as "x". The evaluation was performed by sensory testing with hand touch.

[Air Permeability]

A time (seconds) that was required for air of 50 ml to permeate the leather-like sheet of the present invention was measured by using a Gurley densometer according to the method of JIS P8117.

[Porousness]

A cross section of each sheet was observed by visual observation using an electron microscope so that whether or not a surface of the urethane resin filled was porous was determined. Those having porous surfaces of the urethane resin were evaluated as "○", while those having non-porous surfaces of the urethane resin were evaluated as "x".

TABLE 1

| | | | Production Example No. | | | | | |
|---|---|---|---|---|---|---|---|---|
| | | | 1 | 2 | 3 | 4 | 5 | 6 |
| Type of (a) | | | a-1 | a-2 | a-3 | a-4 | a-5 | a-6 |
| Number of parts (Molar ratio) | (a1) | IPDI | 666 (3) | 666 (3) | — | — | 666 (3) | 666 (3) |
| | | HDI | — | — | 504 (3) | — | — | — |
| | | TDI | — | — | — | 522 (3) | — | — |
| | (a2) | PC | 2000 (1) | — | — | 2000 (1) | 2000 (1) | 2000 (1) |
| | | PES | — | 2000 (1) | 2000 (1) | — | — | — |
| | (a3) | BG | — | — | — | — | 90 (1) | 90 (1) |
| | (a4) | DMPA | 134 (1) | 134 (1) | 134 (1) | 134 (1) | 26.8 (0.2) | — |
| | | TEA (Neutralizer) | 101 (1) | 101 (1) | 101 (1) | 101 (1) | 20 (0.2) | — |
| | | DHS | — | 2.2 (0.01) | — | — | — | — |
| | Solvent | NMP | — | 8.8 | — | — | — | — |
| Content of ionic groups (%) | | | 1.6 | 1.6 | 1.7 | 1.7 | 0.3 | 0 |
| Reaction temperature (° C.) × time (hrs) | | | 50 × 8 | 50 × 8 | 50 × 8 | 50 × 3 | 80 × 8 | 100 × 8 |
| Analyzed value | Viscosity (Pa · s) (at 60° C.) | | 400 | 300 | 150 | 600 | 350 | 200 |
| | NCO(%) | | 2.7 | 2.7 | 3.0 | 3.0 | 2.4 | 3.0 |

TABLE 2

| | | Example No. | | | | |
|---|---|---|---|---|---|---|
| | | 1 | 2 | 3 | 4 | 5 |
| Type of (A) | | (A-1) | (A-2) | (A-3) | (A-4) | (A-5) |
| Kneader | Type | I | I | I | I | I |
| | Revolution(rpm) | 250 | 250 | 250 | 250 | 250 |
| | Operation Power ($KW/m^3$) | 4,300 | 5,000 | 4,300 | 4,800 | 4,000 |

TABLE 2-continued

| | | | Example No. | | | | |
|---|---|---|---|---|---|---|---|
| | | | 1 | 2 | 3 | 4 | 5 |
| Material and Flow rate | (a) | Type | a-1 | a-2 | a-3 | a-4 | a-5 |
| | | Flow rate | 20 | 20 | 20 | 20 | 20 |
| | Dispersion medium | Type | Water | Water | Water | Water | 3% aqueous solution of CE18 |
| | | Flow rate | 9 | 9 | 9 | 9 | 9 |
| Kneading Temperature (° C.) | | | 60 | 60 | 60 | 60 | 60 |
| Viscosity (Pa · s) of (a) at kneading temperature | | | 400 | 300 | 150 | 600 | 350 |
| Residence time (sec.) | | | 20 | 20 | 20 | 20 | 20 |
| Analyzed values | Concentration of solid matters (%) | | 69 | 69 | 69 | 69 | 70 |
| | Viscosity (Pa · s) (at 25° C.) | | 2.0 | 1.5 | 1.5 | 2.0 | 0.5 |
| | Content of Surfactant (%) | | 0 | 0 | 0 | 0 | 1.4 |
| | Content of solvent (%) | | 0 | 0.2 | 0 | 0 | 0 |
| | Average particle diameter (nm) | | 60 | 80 | 75 | 60 | 250 |
| | Content of particles with particle diameter of 5,000 nm or more (%) | | 0 | 0 | 0 | 0 | 0.2 |

Unit of flow rate: L/hr

TABLE 3

| | | | Comparative Example No. | | | |
|---|---|---|---|---|---|---|
| | | | 1 | 2 | 3 | 4 |
| Type | | | (A-6x) | (A-7x) | (A-8x) | (A-9x) |
| Kneader | Type | | II | II | II | II |
| | Revolution(rpm) | | 10,000 | 6,000 | 10,000 | 10,000 |
| | Operation Power ($KW/m^3$) | | 400 | 150 | 300 | 250 |
| Material and Flow rate | (a) | Type | a-1 | a-1 | a-6 | a-6 |
| | | Flow rate | 20 | 20 | 20 | 20 |
| | Dispersion medium | Type | Water | Water | 10% aqueous solution of CE18 | 25% aqueous solution of CE18 |
| | | Flow rate | 9 | 30 | 9 | 16 |
| Kneading Temperature (° C.) | | | 60 | 60 | 60 | 60 |
| Viscosity (Pa · s) of (a) at kneading temperature | | | 400 | 400 | 200 | 200 |
| Residence time (sec.) | | | 12 | 10 | 20 | 20 |
| Analyzed values | Concentration of solid matters (%) | | Revolution stopped 3 mins after kneading started, and motor seized up. | 40 | Coagulation occurred immediately after dispersion. | 67 |
| | Viscosity (Pa · s) (at 25° C.) | | | 0.08 | | 2.0 |
| | Content of Surfactant (%) | | | 0 | | 20 |
| | Content of solvent (%) | | | 0 | | 0 |
| | Average particle diameter (nm) | | | 650 | | 300 |
| | Content of particles with particle diameter of 5,000 nm or more (%) | | | 10 | | 0.3 |

Unit of flow rate: L/hr

TABLE 4

| | | | Example No. | | | | |
|---|---|---|---|---|---|---|---|
| | | | 6 | 7 | 8 | 9 | 10 |
| Type of (B) | | | (B-1) | (B-2) | (B-3) | (B-4) | (B-5) |
| Material and Flow rate | (A) | Type | (A-1) | (A-2) | (A-3) | (A-4) | (A-5) |
| | | Flow rate | 29 | 29 | 29 | 29 | 29 |
| | (E) | Type | IPDA | IPDA | EDA | HDH | IPDA |
| | | Concentration (%) | 6.0 | 6.0 | 2.3 | 3.9 | 4.5 |
| | | Flow rate | 11 | 11 | 11 | 11 | 13 |
| Molar ratio of $NH_2$/NCO | | | 0.6 | 0.6 | 0.6 | 0.6 | 0.6 |
| Analyzed values | Concentration (%) | | 50 | 50 | 50 | 50 | 50 |
| | Viscosity (Pa · s) (at 25° C.) | | 0.40 | 0.35 | 0.55 | 0.65 | 0.15 |
| | Content of surfactant (%) | | 0 | 0 | 0 | 0 | 1.4 |
| | Content of solvent (%) | | 0 | 0.1 | 0 | 0 | 0 |
| | Average particle diameter (nm) | | 65 | 90 | 85 | 70 | 280 |
| | Content of particles with particle diameter of 5,000 nm or more (%) | | 0 | 0 | 0 | 0 | 0.3 |
| Storage Stability | | | ◎ | ◎ | ◎ | ◎ | ◎ |
| Waterproofness | | | ◎ | ◎ | ◎ | ◎ | ○ |

Unit of flow rate: L/hr

TABLE 5

| | | | Comparative example No. | |
|---|---|---|---|---|
| | | | 5 | 6 |
| Type | | | (B-6x) | (B-7x) |
| Material and Flow rate | (A) | Type | (A-7x) | (A-9x) |
| | | Flow rate | 50 | 36 |
| | (E) | Type | IPDA | IPDA |
| | | Concentration (%) | 9.4 | 5.7 |
| | | Flow rate | 7 | 13 |
| Molar ratio of $NH_2$/NCO | | | 0.6 | 0.6 |
| Analyzed values | Concentration (%) | | 35 | 50 |
| | Viscosity (Pa · s) (at 25° C.) | | 0.03 | 0.70 |
| | Content of surfactant (%) | | 0 | 20 |
| | Content of solvent (%) | | 0 | 0 |
| | Average particle diameter (nm) | | 800 | 340 |
| | Content of particles with particle diameter of 5,000 nm or more (%) | | 15 | 0.5 |
| Storage Stability | | | X | ○ |
| Waterproofness | | | ○ | X |

Unit of flow rate: L/hr

TABLE 6

| | | | Example | | |
|---|---|---|---|---|---|
| | | | 11 | 12 | 13 |
| Type of (B1) | | | (B1-1) | (B1-2) | (B1-3) |
| Material and the number of parts | (B) | | (B-1) (200) | (B-1) (200) | (B-5) (200) |
| | (C) | (C1) | CE24 (4) | LE11 (6) | CE18 (0.5) |
| | | (C2) | LE7 (4) | OE7 (2) | LE9 (3) |
| | (D) | | $Na_2SO_4$ (3) | $CaCl_2$ (2) | $CaCl_2$ (1) |
| Heat-sensitive coagulation temperature (° C.) | | | 65 | 47 | 50 |
| Resin adhesion rate (%) | | | 51 | 50 | 48 |
| Migration | | | ○ | ○ | ○ |
| Texture | | | ○ | ○ | ○ |
| Air permeability (sec.) | | | 4 | 5 | 5 |
| Porousness | | | ○ | ○ | ○ |

TABLE 7

| | | | Comparative Example | | | |
|---|---|---|---|---|---|---|
| | | | 7 | 8 | 9 | 10 |
| Type | | | (B1-4x) | (B1-5x) | (B1-6x) | (B1-7x) |
| Material and the number of parts | (B) | | (B-7x) (200) | (B-1) (200) | (B-1) (200) | (B-1) (200) |
| | (C) | (C1) | — | CE60 (4) | LE11 (6) | LE11 (6) |
| | | (C2) | — | LE7 (4) | OE5 (2) | OE7 (2) |
| | (D) | | $CaCl_2$ (1) | $Na_2SO_4$ (3) | $CaCl_2$ (2) | — |
| Heat-sensitive coagulation temperature (° C.) | | | — | 90 or more | — | 90 or more |
| Resin adhesion rate (%) | | | — | 52 | — | 49 |
| Migration | | | — | X | — | X |
| Texture | | | — | Δ | — | X |

TABLE 7-continued

| | Comparative Example | | | |
|---|---|---|---|---|
| | 7 | 8 | 9 | 10 |
| Air permeability (sec.) | — | 18 | — | 28 |
| Porousness | — | X | — | X |

CE60: polyoxyethylene (polymerization degree: 60) cetyl ether (HLB = 18.5)
OE5: polyoxyethylene (polymerization degree: 5) oleyl ether (HLB = 9.0)

Industrial Applicability

The present invention is capable of providing a polyurethane resin aqueous dispersion having excellent storage stability.

Further, the present invention is capable of providing an isocyanate group terminated prepolymer aqueous dispersion suitably used in the production of the foregoing polyurethane resin aqueous dispersion having excellent storage stability.

Further, the present invention is capable of providing an isocyanate group terminated prepolymer aqueous dispersion and a polyurethane resin aqueous dispersion that contain either nothing of, or small amounts of, a surfactant and a solvent.

The polyurethane resin aqueous dispersion of the present invention has excellent characteristics of less flammability, a high level of safety to the human body, and environmental friendliness. Further, the polyurethane resin aqueous dispersion of the present invention can be used in a polyurethane resin sheet material, a paint, an adhesive, a tackiness agent, or a fiber-treating agent possessing waterproofliess. Still further, the polyurethane resin aqueous dispersion of the present invention can be used in a leather-like polyurethane resin sheet material in which migration is prevented.

The invention claimed is:

1. An isocyanate group terminated prepolymer aqueous dispersion (A), comprising:

water; and a prepolymer(a) terminated with an isocyanate group, the (a) being dispersed in the water, a content of the (a) in the (A) being in a range of 60 wt % to 85wt %, wherein the (A) either does not contain a surfactant or contains a surfactant of not more than 10 wt % based on a weight of the (a), and either does not contain a solvent or contains a solvent of not more than 5,000 ppm based on the weight of the (a).

2. The prepalymer aqueous dispersion according to claim 1, wherein particles of the (a) dispersed in the water have an average particle diameter of 30 nm to 500 nm, and a content of particles of the same having a particle diameter of not less than 5,000 nm is not more than 1 vol %.

3. The prepolymer aqueous dispersion (A) according to claim 1, being obtained by subjecting the isocyanate group terminated prepolymer (a) and the water to contact mixing by employing a kneader having an operation power of not less than 2000 $KW/m_3$ so as to disperse the (a) in the water.

4. The prepolymer aqueous dispersion according to claim 1, wherein the (a) has a viscosity of 2 Pa·s to 10,000 Pa·s at a kneading temperature.

5. The prepolymer aqueous dispersion according to claim 1, wherein the (a) includes ionic groups of 0.0 1 wt % to 8 wt % based on the weight of the (a).

6. A method for producing an aqueous dispersion (A) of claim 1 in which a prepolymer (a) terminated with the isocyanate group is dispersed, the method comprising:

subjecting the (a) and water to contact mixing by employing a kneader having an operation power of not less than 2000 $KW/m_3$ so as to disperse the (a) in the water, wherein the (a) either does not contain a surfactant or contains a surfactant of not more than 10 wt % based on a weight of the (a), and either does not contain a solvent or contains a solvent of not more than 5,000 ppm based on the weight of the (a).

7. The method according to claim 6, wherein as the kneader, a multiaxial kneader selected from the group consisting of a continuous kneader, a taper roll, and an extruder is employed.

* * * * *